United States Patent
Kumawat et al.

(10) Patent No.: US 11,403,794 B2
(45) Date of Patent: *Aug. 2, 2022

(54) GLYPH WEIGHT MODIFICATION

(71) Applicant: Adobe Inc., San Jose, CA (US)

(72) Inventors: Nirmal Kumawat, Rajsamand (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,232

(22) Filed: Dec. 7, 2020

(65) Prior Publication Data

US 2021/0090308 A1 Mar. 25, 2021

Related U.S. Application Data

(63) Continuation of application No. 16/505,374, filed on Jul. 8, 2019, now Pat. No. 10,950,017.

(51) Int. Cl.
*G06T 11/20* (2006.01)
*G06T 3/00* (2006.01)
*G06F 40/109* (2020.01)

(52) U.S. Cl.
CPC .......... *G06T 11/203* (2013.01); *G06F 40/109* (2020.01); *G06T 3/0093* (2013.01)

(58) Field of Classification Search
None
See application file for complete search history.

(56) References Cited

U.S. PATENT DOCUMENTS

| | | | |
|---|---|---|---|
| 5,034,991 A | 7/1991 | Hagimae et al. | |
| 5,060,276 A | 10/1991 | Morris | |
| 5,167,013 A | 11/1992 | Hube et al. | |
| 5,524,182 A | 6/1996 | Chari et al. | |
| 5,617,484 A | 4/1997 | Wada et al. | |
| 5,664,086 A | 9/1997 | Brock | |
| 5,754,187 A | 5/1998 | Ristow et al. | |
| 5,806,078 A | 9/1998 | Hug et al. | |
| 6,466,229 B1 | 10/2002 | Nagao | |
| 6,738,526 B1 | 5/2004 | Betrisey et al. | |
| 7,228,501 B2 | 6/2007 | Brown et al. | |
| 7,478,325 B2 | 1/2009 | Foehr et al. | |

(Continued)

OTHER PUBLICATIONS

"Pre-Interview First Office Action", U.S. Appl. No. 16/656,132, dated Aug. 9, 2021, 6 pages.

(Continued)

*Primary Examiner* — YuJang Tswei
(74) *Attorney, Agent, or Firm* — FIG. 1 Patents

(57) ABSTRACT

In implementations of glyph weight modification, a glyph modification system represents an outline of an unmodified glyph as segments having start points and endpoints. The segments have directions based on the start points and the endpoints such that an endpoint of a segment is a start point of another segment. The system identifies features of the unmodified glyph based on the segment directions. A property of the unmodified glyph can be modified by changing coordinates of points of the segments based on the identified features. The glyph modification system generates a modified glyph having the modified property using the points of the segments with the changed coordinates.

20 Claims, 26 Drawing Sheets

(56) References Cited

U.S. PATENT DOCUMENTS

| | | | |
|---|---|---|---|
| 8,271,470 B2 | 9/2012 | Gonzalez et al. | |
| 8,330,760 B1* | 12/2012 | Arnold | G06T 11/203 |
| | | | 345/469 |
| 8,385,971 B2 | 2/2013 | Rhoads et al. | |
| 8,429,524 B2 | 4/2013 | Balinsky et al. | |
| 8,509,537 B2 | 8/2013 | Perronnin et al. | |
| 9,021,020 B1 | 4/2015 | Ramaswamy et al. | |
| 9,047,511 B1 | 6/2015 | Vargis C et al. | |
| 9,146,907 B1 | 9/2015 | Joshi et al. | |
| 9,171,202 B2 | 10/2015 | Hull et al. | |
| 9,202,142 B1 | 12/2015 | Conboy et al. | |
| 9,224,068 B1 | 12/2015 | Ranzato | |
| 9,336,204 B1 | 5/2016 | Amundsen et al. | |
| 9,501,724 B1 | 11/2016 | Yang et al. | |
| 9,576,196 B1 | 2/2017 | Natarajan | |
| 9,805,288 B2 | 10/2017 | Kaasila et al. | |
| 9,824,304 B2 | 11/2017 | Wang et al. | |
| 9,875,429 B2 | 1/2018 | Wang et al. | |
| 10,007,868 B2 | 6/2018 | Jin et al. | |
| 10,074,042 B2 | 9/2018 | Wang et al. | |
| 10,380,462 B2 | 8/2019 | Jin et al. | |
| 10,467,508 B2 | 11/2019 | Wang et al. | |
| 10,699,166 B2 | 6/2020 | Wang et al. | |
| 10,783,409 B2 | 9/2020 | Jin et al. | |
| 10,950,017 B2 | 3/2021 | Kumawat et al. | |
| 11,295,181 B2 | 4/2022 | Kumawat et al. | |
| 2002/0033824 A1 | 3/2002 | Stamm | |
| 2005/0246410 A1 | 11/2005 | Chen et al. | |
| 2006/0062460 A1 | 3/2006 | Jun et al. | |
| 2006/0078204 A1 | 4/2006 | Fujimoto et al. | |
| 2006/0236237 A1 | 10/2006 | Peiro et al. | |
| 2007/0076959 A1 | 4/2007 | Bressan | |
| 2008/0238927 A1 | 10/2008 | Mansfield | |
| 2008/0303822 A1 | 12/2008 | Taylor et al. | |
| 2009/0028443 A1 | 1/2009 | Chen et al. | |
| 2009/0184980 A1* | 7/2009 | Mansfield | G06T 11/203 |
| | | | 345/661 |
| 2010/0010948 A1 | 1/2010 | Ito et al. | |
| 2010/0183217 A1 | 7/2010 | Seung et al. | |
| 2010/0324883 A1 | 12/2010 | Platt et al. | |
| 2011/0115797 A1 | 5/2011 | Kaplan | |
| 2011/0202487 A1 | 8/2011 | Koshinaka | |
| 2011/0271180 A1 | 11/2011 | Lee | |
| 2011/0276872 A1 | 11/2011 | Kataria et al. | |
| 2011/0289407 A1 | 11/2011 | Naik et al. | |
| 2011/0295612 A1 | 12/2011 | Donneau-Golencer et al. | |
| 2012/0078908 A1 | 3/2012 | Djordjevic et al. | |
| 2012/0240039 A1 | 9/2012 | Walker et al. | |
| 2012/0256915 A1* | 10/2012 | Jenkins | G06T 15/40 |
| | | | 345/419 |
| 2013/0054612 A1 | 2/2013 | Danielyan et al. | |
| 2013/0060786 A1 | 3/2013 | Serrano et al. | |
| 2015/0062140 A1 | 3/2015 | Levantovsky et al. | |
| 2015/0063713 A1 | 3/2015 | Yang et al. | |
| 2015/0097842 A1 | 4/2015 | Kaasila et al. | |
| 2015/0278167 A1 | 10/2015 | Arnold et al. | |
| 2015/0339273 A1 | 11/2015 | Yang et al. | |
| 2015/0348278 A1 | 12/2015 | Cavedoni et al. | |
| 2015/0348297 A1 | 12/2015 | Kaasila et al. | |
| 2015/0348300 A1 | 12/2015 | Kaplan | |
| 2015/0371397 A1 | 12/2015 | Wang et al. | |
| 2016/0259995 A1 | 9/2016 | Ishii et al. | |
| 2016/0292589 A1 | 10/2016 | Taylor et al. | |
| 2016/0307347 A1 | 10/2016 | Matteson et al. | |
| 2016/0314377 A1 | 10/2016 | Vieira et al. | |
| 2016/0314766 A1 | 10/2016 | Harrington et al. | |
| 2017/0091951 A1 | 3/2017 | Yoo et al. | |
| 2017/0098138 A1 | 4/2017 | Wang et al. | |
| 2017/0098140 A1 | 4/2017 | Wang et al. | |
| 2017/0098141 A1 | 4/2017 | Wang et al. | |
| 2017/0109600 A1 | 4/2017 | Voloshynovskiy et al. | |
| 2017/0262414 A1 | 9/2017 | Pao et al. | |
| 2018/0082156 A1 | 3/2018 | Jin et al. | |
| 2018/0089151 A1 | 3/2018 | Wang et al. | |
| 2018/0114097 A1 | 4/2018 | Wang et al. | |
| 2018/0239995 A1 | 8/2018 | Wang et al. | |
| 2018/0247386 A1 | 8/2018 | Zheng et al. | |
| 2018/0253878 A1 | 9/2018 | Jain et al. | |
| 2018/0253883 A1 | 9/2018 | Shanbhag | |
| 2018/0300592 A1 | 10/2018 | Jin et al. | |
| 2019/0325277 A1 | 10/2019 | Jin et al. | |
| 2020/0034671 A1 | 1/2020 | Maung | |
| 2021/0012547 A1 | 1/2021 | Kumawat et al. | |
| 2022/0172498 | 6/2022 | Kumawat et al. | |

OTHER PUBLICATIONS

"Restriction Requirement", U.S. Appl. No. 16/656,132, dated Jul. 6, 2021, 6 pages.

"Combined Search and Examination Report", GB Application No. 1710177.5, dated Dec. 13, 2017, 6 pages.

"Corrected Notice of Allowability", U.S. Appl. No. 16/505,374, dated Feb. 10, 2021, 2 pages.

"Corrected Notice of Allowability", U.S. Appl. No. 15/853,120, dated May 7, 2020, 2 pages.

"Corrected Notice of Allowability", U.S. Appl. No. 15/962,514, dated Oct. 7, 2019, 2 pages.

"Corrected Notice of Allowability", U.S. Appl. No. 16/590,121, dated Dec. 23, 2020, 5 pages.

"Corrected Notice of Allowance", U.S. Appl. No. 14/876,609, dated Jun. 29, 2018, 2 pages.

"Corrected Notice of Allowance", U.S. Appl. No. 14/876,667, dated Oct. 18, 2017, 2 pages.

"Corrected Notice of Allowance", U.S. Appl. No. 14/876,660, dated Oct. 25, 2017, 2 pages.

"Corrected Notice of Allowance", U.S. Appl. No. 14/876,660, dated Jul. 20, 2017, 4 pages.

"Corrected Notice of Allowance", U.S. Appl. No. 15/269,492, dated Feb. 13, 2018, 5 pages.

"CSS Fonts Module Level 3", Retrieved at: https://drafts.csswg.org/css-fonts/, Jan. 19, 2016, 88 pages.

"Designing Multiple Master Typefaces", Dec. 1995, 83 pages.

"Final Office Action", U.S. Appl. No. 15/853,120, dated Feb. 4, 2020, 10 pages.

"First Action Interview Office Action", U.S. Appl. No. 16/013,791, dated Jan. 18, 2019, 3 pages.

"First Action Interview Office Action", U.S. Appl. No. 16/502,608, dated May 27, 2020, 3 pages.

"First Action Interview Office Action", U.S. Appl. No. 16/505,374, dated Jul. 28, 2020, 3 pages.

"First Action Interview Office Action", U.S. Appl. No. 16/590,121, dated Dec. 9, 2020, 3 pages.

"First Action Interview Pre-Interview Communication", U.S. Appl. No. 15/269,492, dated Oct. 24, 2017, 3 pages.

"Flexible Type: Methods and Applications of Modifying Glyph's Horizontal and Vertical Weight", Retrieved at: https://diglib.eg.org/handle/10.2312/egp20191039—on Aug. 7, 2019, 1 pages.

"Font Embedding and Substitution", Retrieved at: https://helpx.adobe.com/acrobat/using/pdf-fonts.html—on Aug. 7, 2019, 6 pages.

"Foreign Office Action", GB Application No. 1710177.5, dated Mar. 6, 2020, 4 pages.

"Intellectual property protection of typefaces—Wikipedia", Retrieved at: https://en.wikipedia.org/wiki/Intellectual_property_protection_of_typefaces—on Jun. 7, 2016, 4 pages.

"Multiple master fontshttps://en.wikipedia.org /wiki/Variable fonts", Retrieved at: https://en.wikipedia.org/wiki/Multiple_master_fontshttps://en.wikipedia.org/wiki/Variable_fonts—on Apr. 10, 2019, 1 page.

"Non-Final Office Action", U.S. Appl. No. 16/502,608, dated Apr. 22, 2020, 13 pages.

"Notice of Allowance", U.S. Appl. No. 16/013,791, dated Mar. 29, 2019, 10 pages.

"Notice of Allowance", U.S. Appl. No. 15/962,514, dated Jun. 21, 2019, 13 pages.

"Notice of Allowance", U.S. Appl. No. 16/502,608, dated Jun. 18, 2020, 16 pages.

"Notice of Allowance", U.S. Appl. No. 14/876,667, dated Sep. 13, 2017, 16 pages.

(56) References Cited

OTHER PUBLICATIONS

"Notice of Allowance", U.S. Appl. No. 15/269,492, dated Jan. 18, 2018, 17 pages.
"Notice of Allowance", U.S. Appl. No. 15/853,120, dated Mar. 30, 2020, 8 pages.
"Notice of Allowance", U.S. Appl. No. 14/876,609, dated May 3, 2018, 8 pages.
"Notice of Allowance", U.S. Appl. No. 14/876,660, dated Jul. 6, 2017, 8 pages.
"Notice of Allowance", U.S. Appl. No. 16/505,374, dated Nov. 5, 2020, 8 pages.
"Notice of Allowance", U.S. Appl. No. 16/590,121, dated Dec. 17, 2020, 8 pages.
"Pre-Interview Communication", U.S. Appl. No. 14/876,609, dated Feb. 21, 2018, 3 pages.
"Pre-Interview Communication", U.S. Appl. No. 14/876,660, dated Mar. 17, 2017, 3 pages.
"Pre-Interview Communication", U.S. Appl. No. 14/876,667, dated Jul. 28, 2017, 3 pages.
"Pre-Interview First Office Action", U.S. Appl. No. 15/962,514, dated Apr. 15, 2019, 3 pages.
"Pre-Interview First Office Action", U.S. Appl. No. 16/505,374, dated Jul. 7, 2020, 3 pages.
"Pre-Interview First Office Action", U.S. Appl. No. 15/853,120, dated Sep. 17, 2019, 3 pages.
"Pre-Interview First Office Action", U.S. Appl. No. 16/590,121, dated Nov. 3, 2020, 3 pages.
"Pre-Interview First Office Action", U.S. Appl. No. 16/502,608, dated Apr. 28, 2020, 4 pages.
"Pre-Interview First Office Action", U.S. Appl. No. 16/013,791, dated Nov. 23, 2018, 4 pages.
"Restriction Requirement", U.S. Appl. No. 15/962,514, dated Feb. 14, 2019, 6 pages.
"Restriction Requirement", U.S. Appl. No. 14/876,609, dated Sep. 15, 2017, 7 pages.
"Supplemental Notice of Allowance", U.S. Appl. No. 14/876,667, dated Dec. 27, 2017, 2 pages.
"Variable fonts—Wikipedia", Retrieved at: https://en.wikipedia.org/wiki/Variable_fonts—on Apr. 10, 2019, 3 pages.
"W3C Recommendation—Fonts", Retrieved at: https://www.w3.org/TR/2011/REC-CSS2-20110607/fonts.html, 2011, 9 pages.
Bell, Sean et al., "Learning visual similarity for product design with convolutional neural networks", ACM Transactions on Graphics (TOG)—Proceedings of ACM SIGGRAPH, Aug. 2015, 10 pages.
Cronin, Shaun , "The Web Designer's Guide to Font Replacement Methods", Retrieved at: http://webdesign.tutsplus.com/articles/the-web-designers-guide-to-font-replacementmethods--webdesign-975, Aug. 3, 2011, 1 page.
Gaultney, Victor , "Font Licensing and Protection Details", Aug. 5, 2003, 3 pages.
Hudson, John , "Introducing OpenType Variable Fonts", Sep. 14, 2016, 15 pages.
Knuth, Donald E. , "The Concept of a Meta-Fong", Dec. 1982, 25 pages.
O'Donovan, Peter et al., "Exploratory Font Selection Using Crowdsourced Attributes", ACM Transactions on Graphics, Jul. 27, 2014, 9 pages.
Oliver, Owen , "Font Replacement Methods: Techniques for Web Fonts", Retrieved at: http://www.instantshift.com/2013/08/29/font-replacement-methods/, Aug. 29, 2013, 11 pages.
Ross, , "The Law on Fonts and Typefaces: Frequently Asked Questions", Retrieved at: http://blog.crowdspring.com/2011/03/font-law-licensing, Mar. 23, 2011, 7 pages.
Schoff, Florian et al., "FaceNet: A Unified Embedding for Face Recognition and Clustering", CVPR 2015, Mar. 12, 2015, pp. 815-823.
Shamir, Ariel et al., "Extraction of Typographic Elements from Outline Representations of Fonts", Aug. 1996, 12 pages.
Wang, Jiang et al., "Learning Fine-grained Image Similarity with Deep Ranking", CVPR 2014, Apr. 7, 2014, 8 pages.
Wang, Zhangyang et al., "DeepFont: Identify Your Font from an Image", Proceedings of the 23rd ACM international conference on Multimedia (MM '15). Association for Computing Machinery, New York, NY [retrieved Oct. 13, 2020]. Retrieved from the Internet <https://arxiv.org/pdf/1507.03196.pdf>., Jul. 12, 2015, 9 pages.
"Notice of Allowance", U.S. Appl. No. 16/656,132, dated Nov. 30, 2021, 8 pages.
"Corrected Notice of Allowability", U.S. Appl. No. 16/656,132, filed Mar. 9, 2022, 4 pages.

* cited by examiner

300

302
Generate segments representing an outline of a glyph, each of the segments having a start point, an end point, and a direction defined by the start point and the end point

304
Identify a glyph feature of the glyph using directions of the segments

306
Modify the outline of the glyph based on the glyph feature

308
Generate a modified glyph based on the modified outline

*Fig. 3*

GLYPH WEIGHT MODIFICATION

RELATED APPLICATION

This Application claims priority as a continuation of U.S. patent application Ser. No. 16/505,374, filed Jul. 7, 2019, and titled "Glyph Weight Modification," the entire disclosure of which is hereby incorporated by reference.

BACKGROUND

When communicating a message using text, a visual appearance of the text is often an important part of the message being communicated. In some cases, the visual appearance of the text can be as important to the message as the substance of the text. As a result, type designers have created thousands of different typefaces, many of which include multiple fonts. Some conventional systems for changing a visual appearance of text enable graphic designers to convert the text to outlines which can then be modified on an individual basis to generate modified glyphs. For example, a graphic designer may modify individual glyphs to adjust a slant angle or modify a thickness of stems to change the visual appearance of the text. However, these conventional systems are undesirable because the modification of individual glyphs is labor intensive and the modified glyphs do not maintain important properties of text such as searchability.

Other conventional systems for modifying a visual appearance of text require at least two master fonts which are original fonts. These conventional systems can generate a new font by interpolating between the at least two master fonts. The visual appearance of the new font differs from a visual appearance of the at least two master fonts based on the interpolation. However, these systems require multiple font files and the generation of a new font file to change the visual appearance of the text. Conventional systems which allow a single font file to store a continuous range of design variants may also be used to change a visual appearance of text. However, these systems are limited to changing visual appearance using modification values of the single font file which may be limited in terms of the functionality which they can provide. For example, the modification values may only allow modification of a single visual feature of the text.

SUMMARY

Systems and techniques are described for glyph weight modification. A computing device implements a glyph modification system which receives an outline of a glyph and a property of the glyph to modify as inputs. The system can represent the outline of the glyph as segments and each of the segments has a start point, an endpoint, and a direction based on the start point and the endpoint.

The glyph modification system identifies features of the glyph using the directions and points of the segments. These identified features can include aspects of vertical stems of the glyph and/or aspects of horizontal bars of the glyph. The system modifies the outline of the glyph based on the identified features of the glyph and the property of the glyph to modify. A modified glyph is generated based on the modified outline.

The described systems improve glyph style modification technology because these systems enable glyph modification functionality using only a single font file and without generating a new font file which is not possible using conventional systems. Additionally, the systems described are implemented without requiring any information from the single font file other than an outline of an original glyph. These systems do not require multiple master fonts to modify glyph properties and the described systems can modify all the glyphs of a font simultaneously. In this manner, individual modification of outlines of glyphs is not necessary which is also an improvement relative to conventional systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which glyph features of a glyph are identified and a modified glyph is generated.

DETAILED DESCRIPTION

Overview

Figure 1:
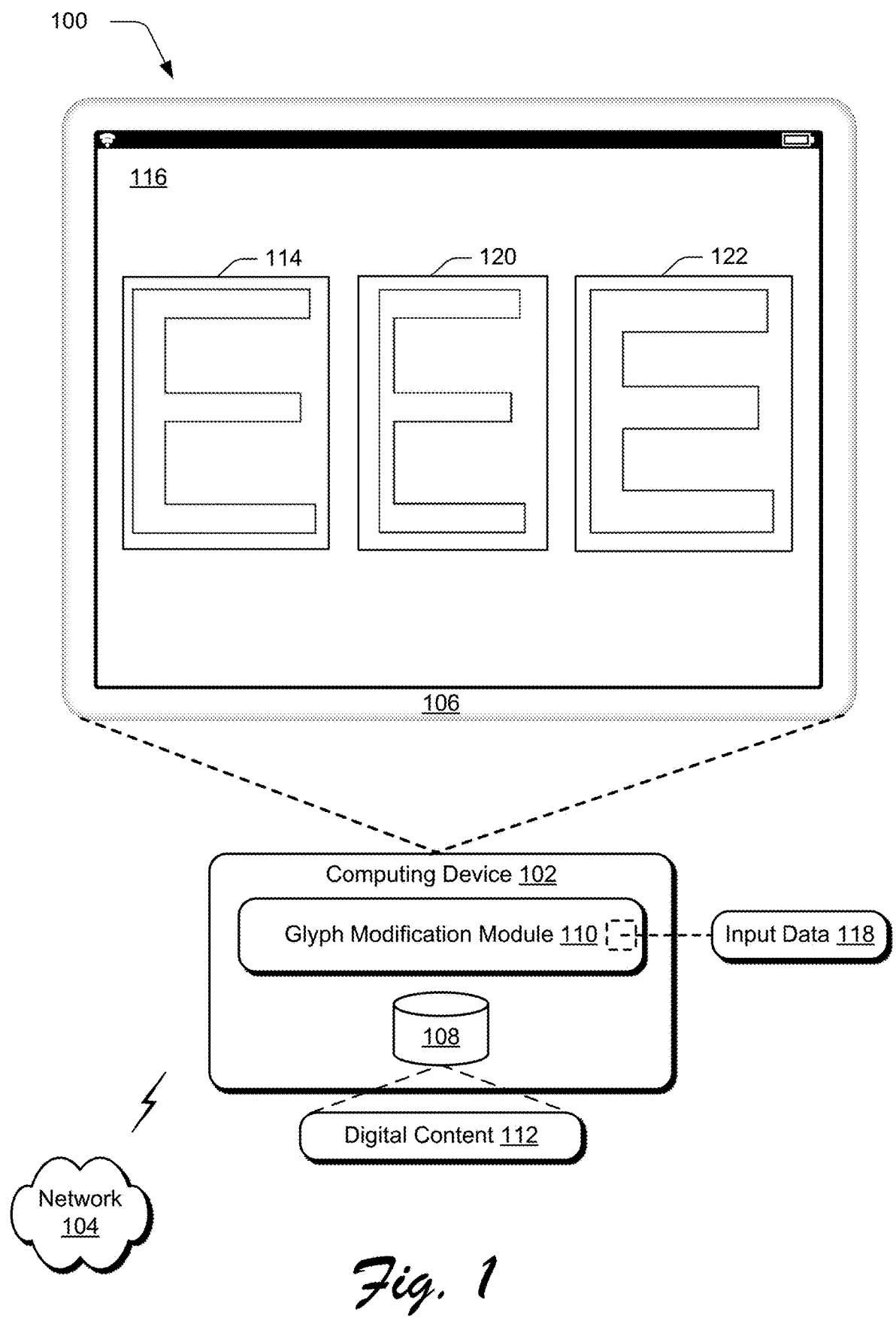
FIG. 1 is an illustration of an environment in an example implementation that is operable to employ digital systems and techniques as described herein.

A visual appearance of text is often an important part of a message being communicated using the text. For example, the appearance of the text can be as important to the message as the substance of the text itself. The importance of this visualization has caused type designers to create thousands of different typefaces, many of which include multiple fonts. Some of the conventional systems for changing a visual appearance of text enable graphic designers to convert the text into outlines which can then be individually modified to generate modified glyphs. With these conventional systems, a graphic designer may modify an individual glyph to adjust a slant angle or modify a thickness of its stems to change the visual appearance of the text represented by the individual glyph. Conventional systems of this type are undesirable because the modification of individual glyphs is labor intensive. Glyphs modified in this manner do not maintain important properties of text such as searchability.

Several other conventional systems for modifying a visual appearance of text require at least two master fonts which are original fonts. These systems interpolate between the at least two master fonts to generate a new font. A visual appearance of the new font differs from a visual appearance of the at least two master fonts based on the interpolation. These systems require generation of a new font file to change the visual appearance of the text which may not be compatible across applications. Conventional systems which allow a single font file to store a continuous range of design variants may also be used to change a visual appearance of text. However, even these systems are limited to changing visual appearance using modification values of the single font file which may be limited in terms of the functionality which they can provide. For these systems, the modification values may only allow modification of a single visual feature of the text.

Systems and techniques are described for glyph weight modification. A computing device implements a glyph modification system which can receive an outline of a glyph and a property of the glyph to modify as inputs. The system may represent the outline of the glyph as segments such that each of the segments has a start point, an endpoint, and a direction based on the start point and the endpoint. For example, the system can represent the outline of the glyph as Bezier paths.

The glyph modification system may identify features of the glyph using the directions and points of the segments. In particular, the system may identify the features of the glyph by determining a direction of a current segment and a direction of a next segment such that an endpoint of the current segment is a start point of the next segment and this point is common to both segments. Based on the direction of the current segment and the direction of the next segment, the system can also prevent overlaps and kinks in scenarios where the direction of the next segment is opposite to the direction of the current segment.

The identified features of the glyph can include aspects of vertical stems of the glyph and/or aspects of horizontal bars of the glyph, and the glyph modification system can change coordinates of points of segments to modify a thickness of the vertical stems and/or a thickness of the horizontal bars. If modifying a thickness of stem or bar could cause overlaps or kinks such as in cases where consecutive segments have opposite directions, then the glyph modification system can use the theory of intersecting lines to identify a point of intersection of the segments and the system can change the coordinates of the points of the segments to prevent the overlaps and kinks.

The system can modify the outline of the glyph based on the identified features of the glyph and the property of the glyph to modify. For example, if the property of the glyph to modify is horizontal weight of the glyph, then the system can modify the features of the glyph identified as vertical stems of the glyph. If the property of the glyph to modify is vertical weight of the glyph, then the system can modify the features of the glyph identified as horizontal bars.

The system can generate a modified glyph based on the modified outline, and the modified glyph may maintain important properties of text such as searchability. The modified glyph may maintain an origin of the outline of the glyph as well as a bounding box height of the outline of the glyph by scaling and/or shifting the modified outline. The systems described may generate the modified glyph without using interpolation or relying on modification values of a font file.

The described systems improve glyph style modification technology because these systems enable glyph modification functionality using only a single font file and without generating a new font file which is not possible using conventional systems. Additionally, the systems described are implemented without requiring any information from the single font file other than an outline of an original glyph which is also not possible through use of conventional systems. For example, the described systems are capable of weight modification for any type of outline font, e.g., Latin, CJK, Hebrew, Indic fonts, etc. These systems do not require multiple master fonts to modify glyph properties and the described systems can modify all the glyphs of a font simultaneously. In this manner, individual modification of outlines of glyphs is not necessary which is the case with conventional systems.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a glyph modification module 110. The storage device 108 is illustrated to include digital content 112.

An example of the digital content 112 is a glyph 114 which is displayed in a user interface 116 on the display device 106. The glyph modification module 110 is illustrated as having, receiving, and/or transmitting input data 118. For example, the computing device 102 may implement the glyph modification module 110 to receive the input data 118 which can include the glyph 114 as well as an indication of properties of the glyph to modify and a quantification of an amount by which to modify the properties of the glyph 114. In response to receiving the input data 118, the glyph modification module 110 can be implemented to generate modified glyphs such as a first modified glyph 120 and a second modified glyph 122 which are also displayed in the user interface 116 of the display device 106. For example, the glyph modification module 110 may generate the first modified glyph 120 and the second modified glyph 122 based on the indicated properties of the glyph 114 to modify and the amount by which to modify these properties.

As shown in FIG. 1, a horizontal weight of the glyph 114 has been modified to generate the first modified glyph 120 and a vertical weight of the glyph 114 has been modified to generate the second modified glyph 122. In one example, the indicated properties of the glyph may include the horizontal weight of the glyph 114 with respect to the first modified glyph 120. For example, the indicated properties of the glyph can include the vertical weight of the glyph 114 with respect to the second modified glyph 122.

As shown in the illustrated example, the modification to the horizontal weight of the glyph 114 modifies a thickness of vertical stems of the glyph 114. As illustrated, the first modified glyph 120 represents an example of a decrease in the horizontal weight of the glyph 114. As shown, the modification to the vertical weight of the glyph 114 modifies a thickness of horizontal bars of the glyph 114. As compared to the glyph 114, the second modified glyph 122 represents an example of an increase in the vertical weight of the glyph 114.

Figure 2:
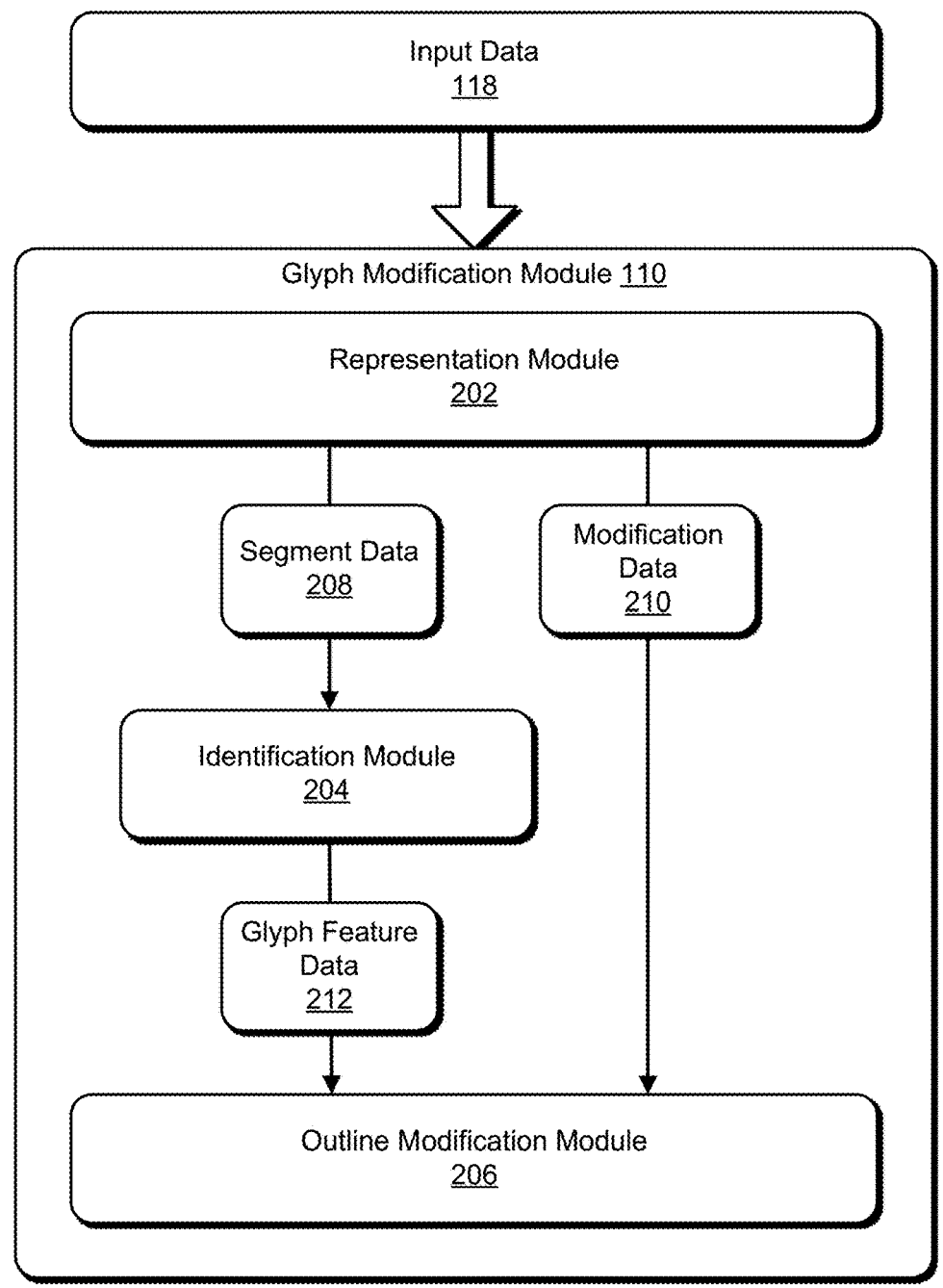
FIG. 2 depicts a system in an example implementation showing operation of a glyph modification module.

FIG. 2 depicts a system 200 in an example implementation showing operation of a glyph modification module. The glyph modification module 110 is illustrated as including a representation module 202, an identification module 204, and an outline modification module 208. The computing device 102 can implement to the glyph modification module 110 to receive input data 118, e.g., the glyph modification module 110 may receive the input data 118 over the network 104 or based on user inputs received by the computing device 102 via the user interface 116. In one or more implementations, the representation module 202 may receive the input data 118 and the representation module 202 may process the input data 118 as segment data 208 and modification data 210. For example, the glyph modification module 110 may receive an outline of the glyph 114 as part of receiving the input data 118 and the representation module 202 can be implemented to convert the outline of the glyph 114 into segments which are represented by the segment data 208.

In one example, the segment data 208 describes the outline of the glyph 114 as closed Bezier paths. In this way, each of the segments is defined by a start point and an endpoint and these two points also define a direction of each segment as being from the start point to the endpoint. The segment data 208 can also describe other features of the segments such as a segment type as being either a line or a curve.

As previously described, the input data 118 can also include an indication of properties of the glyph 114 to modify and a quantification of an amount by which to modify these properties. As illustrated in FIG. 2, the representation module 202 is implemented to extract the indication of properties to modify and the quantification of the amount by which to modify the indicated properties from the input data 118. In this manner, the representation module 202 receives the input data 118 and generates the modification data 210 which describes the properties of the glyph 114 to modify and the amount by which to modify these properties based on the input data 118.

For example, as part of generating the first modified glyph 120 illustrated in FIG. 1, the glyph modification module 110 may receive the input data 118 which in this example includes the outline of the glyph 114 and the horizontal weight as a property of the glyph 114 to modify. As part of generating the second modified glyph 122 also illustrated in FIG. 1, the glyph modification module 110 can receive the input data 118 which may include the outline of the glyph 114 and the vertical weight as a property of the glyph 114 to modify.

The identification module 204 is illustrated as receiving the segment data 208 which describes the outline of the glyph 114 as segments having directions such as Bezier paths. In one or more implementations, the identification module 204 is implemented to receive the segment data 208 and process the segment data 208 to generate glyph feature data 212. For example, the identification module 204 can process the segment data 208 to generate the glyph feature data 212 which describes relationships between segments based on the directions of the segments and also based on points common to the segments.

Consider an example in which a first segment has a start point and an endpoint and a second segment also has a start point and an endpoint such that the endpoint of the first segment is the start point of the second segment. In this example, the first segment and the second segment are related as having a point in common, i.e., the endpoint of the first segment and the start point of the second segment is common to both the first and second segment.

In one or more implementations, the identification module 204 may be implemented to classify directions of segments, e.g., by processing the segment data 208 and generating glyph feature data 212 describing the classified directions. In one example, the identification module 204 can classify directions of segments based on coordinates of start points and endpoints of the segments. In a two-dimensional example, the identification module 204 can determine or classify a segment direction with reference to the segment's start point and endpoint in a Cartesian plane such that differences between x-coordinates and y-coordinates of the start point and endpoint define the segment's direction.

By way of example, if a value of an x-coordinate of a segment's start point is less than a value of an x-coordinate of the segment's endpoint, then the identification module 204 can determine that the segment's direction is towards the right and if the value of the x-coordinate of the segment's start point is greater than the value of the x-coordinate of the endpoint, then then the identification module 204 can determine that the segment's direction is towards the left. Further, if a value of a y-coordinate of the segment's start point is less than a value of a y-coordinate of the segment's endpoint, then the identification module 204 may determine that the segment's direction is up, and if the value of the y-coordinate of the start point is greater than the value of the y-coordinate of the endpoint, then the identification module 204 may determine that the segment's direction is down.

In one or more implementations, the identification module 204 may be implemented to identify glyph features based on the segment directions. For example, if a current segment has a direction of Up, LeftUp, or RightUp, and if a next segment has a direction of Up, LeftUp, RightUp, Left, or Right, then the identification module 204 may identify an endpoint of the current segment and a start point of the next segment as belonging to a right side of a vertical stem of a glyph. In a similar example, if a current segment has a direction of Down, LeftDown, or RightDown, and if a next segment has a direction of Down, LeftDown, RightDown, Left, or Right, then the identification module 204 can identify an endpoint of the current segment and a start point of the next segment as belonging to a left side of a vertical stem of a glyph. In one example, if a current segment has a direction of Left, LeftUp, or LeftDown, and if a next segment has a direction of Left, LeftUp, LeftDown, Up, or Down, then the identification module 204 may identify an endpoint of the current segment and a start point of the next segment as belonging to a top side of a horizontal bar of a glyph. In another example, if a current segment has a direction of Right, RightUp, or RightDown, and if a next segment has a direction of Right, RightUp, RightDown, Up, or Down, then the identification module 204 may identify an endpoint of the current segment and a start point of the next segment as belonging to a bottom side of a horizontal bar of a glyph.

The outline modification module 206 is illustrated as receiving the glyph feature data 212 and the modification data 210. In one example, the outline modification module 206 is implemented to process the glyph feature data 212 and the modification data 210 to generate a modified glyph such as the first modified glyph 120 or the second modified glyph 122. In this manner, the outline modification module 206 may process the modification data 210 to determine a property of the outline of the glyph 114 to modify and an amount by which to modify the determined property. The outline modification module 206 can process the glyph feature data 212 to modify the outline of the glyph 114 based on the modification data 210 and the segment directions. In some implementations, the outline modification module 206 may also be implemented to generate a modified glyph based on the modified outline of the glyph 114.

Consider an example in which the outline modification module 206 receives the modification data 210 and the glyph feature data 212 and the outline modification module 206 processes the modification data 210 to determine that the property of the glyph 114 to modify is the horizontal weight of the glyph 114. In this example, the outline modification module 206 can process the glyph feature data 212 to identify segments of the outline of the glyph 114 which are representative of vertical stems of the glyph 114 based on the determined horizontal weight of the glyph as the property of the glyph 114 to modify and the directions of the segments of the outline. Continuing this example, the outline modification module 206 can be further implemented to process the modification data 210 to determine that the quantification of the amount by which to modify the property of the glyph 114 is to decrease the horizontal weight of the glyph 114 by an example amount. Still in this example, the outline modification module 206 may be even further implemented to process the glyph feature data 212 to decrease a thickness of the vertical stems of the glyph 114 by the example amount by modifying the outline of the glyph 114. In this example manner, the outline modification module 206 may generate the first modified glyph 120 based on the modified outline of the glyph 114.

Consider another example in which the outline modification module 206 receives the modification data 210 and the glyph feature data 212 and the outline modification module 206 processes the modification data 210 to determine that the property of the glyph 114 to modify is the vertical weight of the glyph 114. In this example, the outline modification module 206 can process the glyph feature data 212 to identify segments of the outline of the glyph 114 which are representative of horizontal bars of the glyph 114 based on the determined vertical weight of the glyph as the property of the glyph 114 to modify. Continuing this example, the outline modification module 206 can be further implemented to process the modification data 210 to determine that the quantification of the amount by which to modify the property of the glyph 114 is to increase the vertical weight of the glyph 114 by an example amount. Still in this example, the outline modification module 206 may be even further implemented to process the glyph feature data 212 to increase a thickness of the horizontal bars of the glyph 114 by the example amount by modifying the outline of the glyph 114. In this example manner, the outline modification module 206 may generate the second modified glyph 122 based on the modified outline of the glyph 114.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

FIG. 3 is a flow diagram depicting a procedure 300 in an example implementation in which glyph features of a glyph are identified and a modified glyph is generated. Segments representing an outline of a glyph are generated (block 302), each of the segments having a start point, and endpoint, and a direction defined by the start point and the endpoint. For example, the glyph modification module 110 may be implemented by the computing device 102 to generate the segments representing the outline of the glyph. A glyph feature of the glyph is identified (block 304) using directions of the segments. In one example, the identification module 204 may be implemented to identify the glyph feature of the glyph using directions of the segments. The outline of the glyph is modified (block 306) based on the glyph feature. For example, the outline modification module 206 can be implemented to modify the outline of the glyph based on the glyph feature. A modified glyph is generated (block 308) based on the modified outline. In one example, the outline modification module 206 may be implemented to generate the modified glyph based on the modified outline.

By representing an outline of a glyph as segments, the systems described are capable of weight modification without having any information from a font file other than an outline of an original glyph. This is not possible using conventional techniques as described previously. Thus, the described systems are capable of weight modification for any type of outline font, e.g., Latin, CJK, Hebrew, Indic fonts, etc. Accordingly, the systems described herein represent a significant improvement relative to conventional systems.

Figure 4:
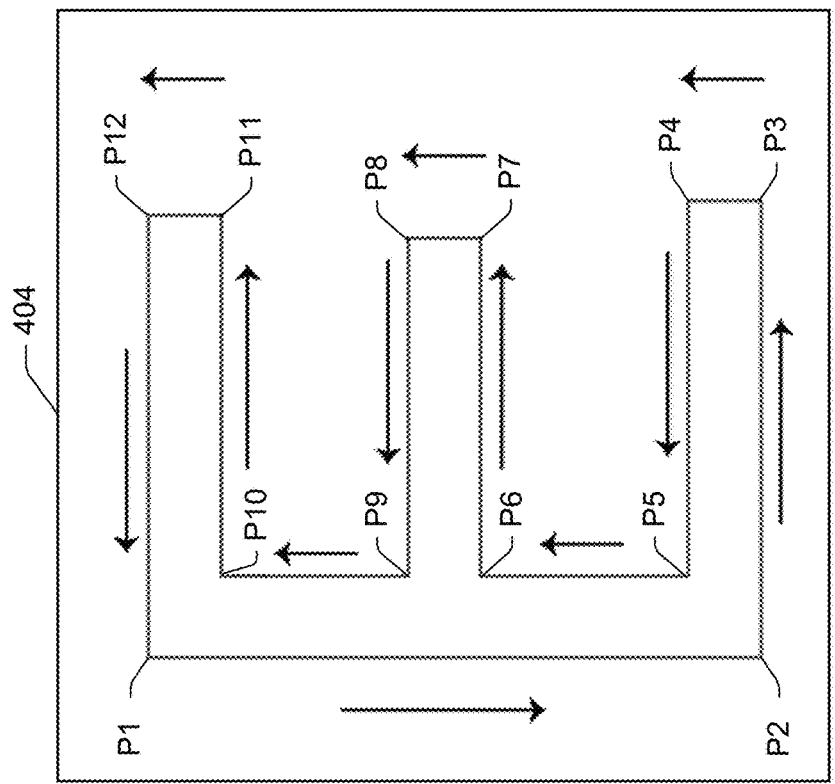
FIG. 4 is an illustration depicting an example of a representation of a glyph outline represented as segments with directions.
Figure 4:
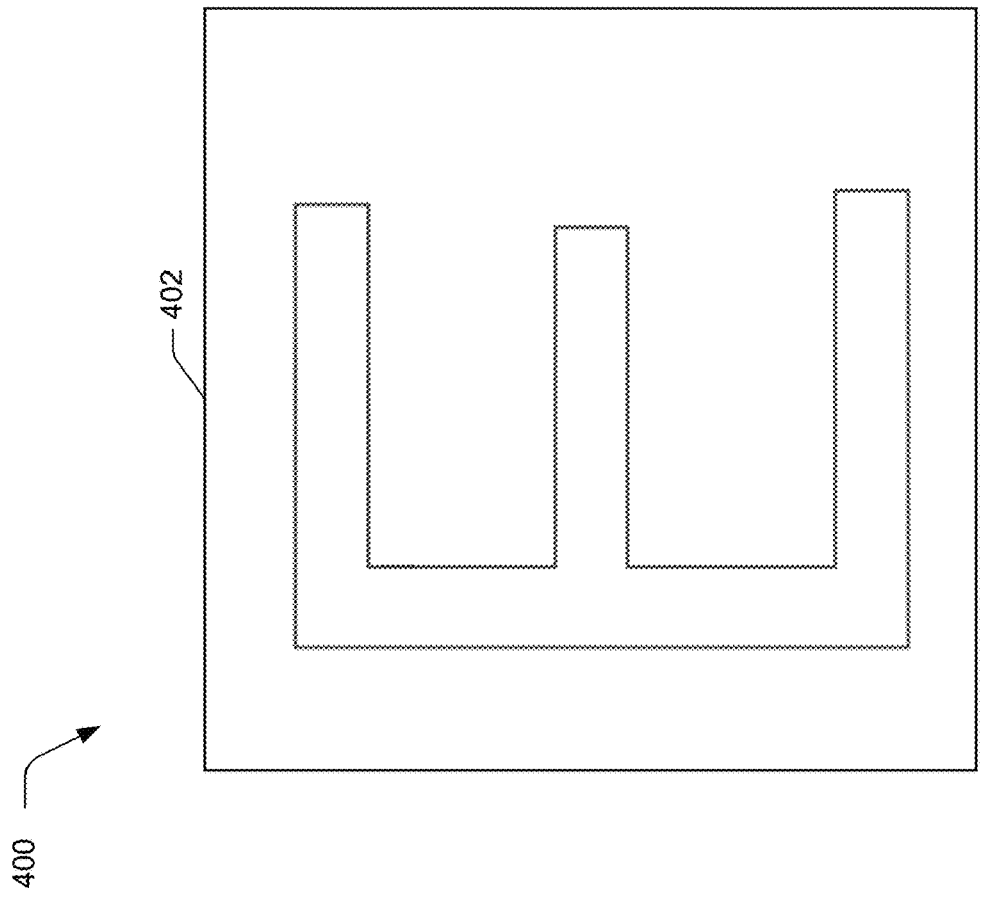

FIG. 4 is an illustration depicting an example of a representation 400 of a glyph outline represented as segments with directions. As shown, the representation 400 includes a glyph 402 and a representation 404 of the glyph 402 as segments having directions. In the example illustrated in FIG. 4, the representation is illustrated as a closed Bezier path of an outline of the glyph 402 denoted as points P1-P12. In one example, points P1-P12 may be expressed as:

$$P=[x,y]$$

where: P represents each point; x is an x-coordinate of the point; and y is a y-coordinate of the point. In another example, the glyph 402 can be represented by one or more segments as:

$$S=[p0,p1]$$

where: S represents each segment; p0 is a starting point of the segment; and p1 is an endpoint of the segment. Additionally, each segment may be a line segment or a curve segment so for each S if p0 and p1 are connected by a line, then S is a line segment; and if p0 and p1 are connected by a curve, then S is a curve segment. In one example, a direction of each segment may be expressed as:
  Up: [p0.y<p1.y and p0.x==p1.x]
  Down: [p0.y>p1.y and p0.x==p1.x]
  Left: [p0.x>p1.x and p0.y==p1.y]
  Right: [p0.x<p1.x and p0.y==p1.y]
  LeftUp: [p0.x>p1.x and p0.y<p1.y]
  RightUp: [p0.x<p1.x and p0.y<p1.y]
  LeftDown: [p0.x>p1.x and p0.y>p1.y]
  RightDown: [p0.x<p1.x and p0.y>p1.y]
where: p0.x is the x-coordinate of the start point of the segment; p0.y is the y-coordinate of the start point of the segment; p1.x is the x-coordinate of the endpoint of the segment; and p1.y is the y-coordinate of the endpoint of the segment.

In an example, the outline of the glyph 402 can be expressed as segments with directions as follows:
  LineSegment[P1, P2]: Down
  LineSegment[P2, P3]: Right
  LineSegment[P3, P4]: Up
  LineSegment[P4, P5]: Left
  LineSegment[P5, P6]: Up
  LineSegment[P6, P7]: Right
  LineSegment[P7, P8]: Up
  LineSegment[P8, P9]: Left
  LineSegment[P9, P10]: Up
  LineSegment[P10, P11]: Right
  LineSegment[P11, P12]: Up
  LineSegment[P12, P1]: Left By representing the glyph 402 in the manner illustrated by the representation 404 of the glyph 402, the segments and their directions can be leveraged to provide a variety of functionality which is illustrated by the following examples.

Direction Based Example for Modifying Horizontal Weight

Figure 5:
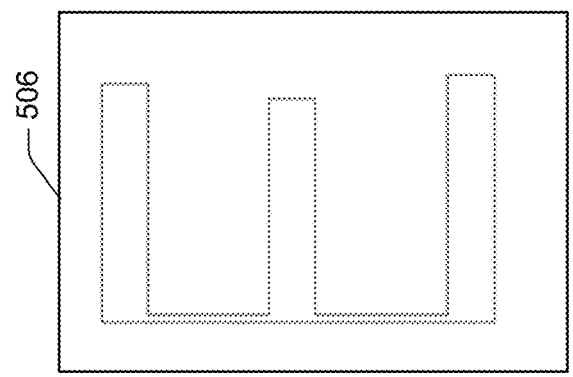
FIG. 5 is an illustration depicting an example representation of generating modified glyphs by modifying horizontal weight.
Figure 5:
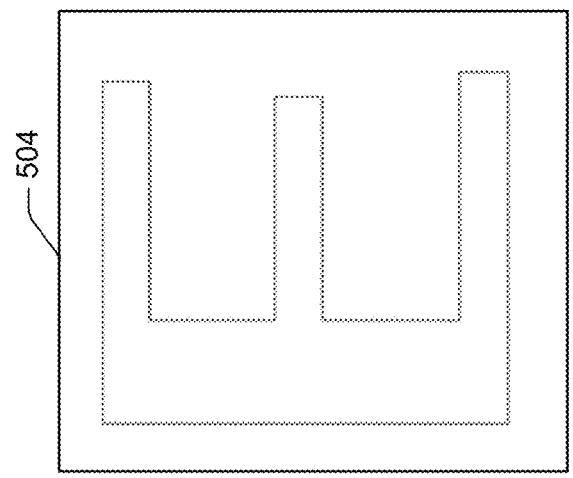
Figure 5:
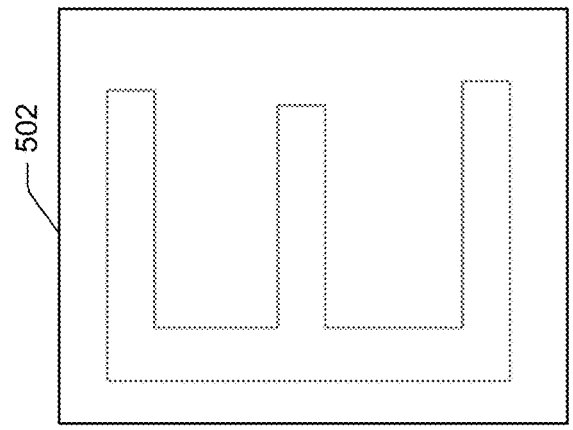

FIG. 5 is an illustration depicting an example representation 500 of generating modified glyphs by modifying horizontal weight. As shown in FIG. 5, the representation 500 includes an unmodified glyph 502. As described previously, modifying horizontal weight changes a thickness of vertical stems of a glyph. In one example, this may be accomplished by leveraging segment directions and common points of segments such as those illustrated in the representation 404 of the glyph 402.

Consider an example in which an indication of a property of the unmodified glyph 502 to modify included in the input data 118 is horizontal weight and the quantification of the amount by which to modify the horizontal weight is expressed as a percentage of a stroke width of a vertical stem of the unmodified glyph 502 such that a positive percentage corresponds to an increase in the stroke width of the vertical stem and a negative percentage corresponds to a decrease in the stroke width of the vertical stem. A modification value for the vertical stem may be expressed as:

$$\text{delta} = \frac{[(\text{modified stroke width}) - (\text{original stroke width})]}{2}$$

where: delta is a value to add to both sides of the vertical stem to modify the horizontal weight of the vertical stem; original stroke width is the stroke width of the vertical stem of the unmodified glyph 502; and modified stroke width is the stroke width of the vertical stem after applying a percentage increase or decrease to the original stroke width.

In one or more implementations, the computing device 102 may implement the glyph modification module 110 to apply the delta value to an outline of the unmodified glyph 502 based on directions of segments representing the outline of the unmodified glyph 502. For example, the glyph modification module 110 may be implemented apply the delta value to coordinates of points of the segments representing the outline of the unmodified glyph 502 based on directions of segments having the points. As illustrated in FIG. 4, each of the points P1-P12 belongs to at least two segments, and the glyph modification module 110 can apply the delta value to coordinates of the points P1-P12 based on directions of the segments having the points P1-P12. Since each of the points P1-P12 in this example represents a starting point of a first segment and an ending point of a second segment, the glyph modification module 110 may determine an application of the delta value to the coordinates of the points P1-P12 based on a current segment and a next segment. In this manner, any particular point of the points P1-P12 represents an endpoint of a current segment and a start point of a next segment.

For example, the glyph modification module 110 can determine whether a current segment's direction is Up, LeftUp, or RightUp. In response to determining that the current segment's direction is Up, LeftUp, or RightUp, the glyph modification module 110 may determine whether a direction of the next segment is Up, LeftUp, RightUp, Left, or Right. If the current segment's direction is Up, LeftUp, or RightUp, and if the next segment's direction is Up, LeftUp, RightUp, Left, or Right, then the glyph modification module 110 may apply the delta value to a common point of the current segment and the next segment by adding the delta value to an x-coordinate of the common point. In other words, if the current segment's direction is Up, LeftUp, or RightUp, and if the next segment's direction is Up, LeftUp, RightUp, Left, or Right, then the computing device 102 may implement the glyph modification module 110 to add the delta value to an x-coordinate of a point which is the endpoint of the current segment and the start point of the next segment.

In one example, if the current segment's direction is Up, LeftUp, or RightUp, and if the next segment's direction is Down, LeftDown, or RightDown, then the glyph modification module 110 may prevent a segment from overlapping another segment of the segments representing the outline of the unmodified glyph 502. For example, it is possible in scenarios in which consecutive segments have opposite directions or opposite direction components that a delta value will be added to a first segment and the delta value will be subtracted from a second segment such as to overlap the segments. In other words, the effect of the application of the delta value can cause the first segment and the second segment to shift in opposing directions, and because the first segment and the second segment are consecutive segments, this scenario can create overlaps or kinks in an outline of a modified glyph. To avoid this, the glyph modification module 110 can be implemented to use the theorem of intersecting lines which is also referred to as the intercept theorem to identify a point at which the first segment and the second segment intersect. In this manner, the glyph modification module 110 may change a y-coordinate of a common point between the first segment and the second segment based on the identified point at which the first segment and the second segment intersect to prevent the overlaps or kinks.

In another example, the glyph modification module 110 may determine whether a current segment's direction is Down, LeftDown, or RightDown. Responsive to determining that the current segment's direction is Down, LeftDown, or RightDown, the glyph modification module 110 may determine whether a direction of a next segment is Down, LeftDown, RightDown, Left, or Right. If the current segment's direction is Down, LeftDown, or RightDown, and if the next segment's direction is Down, LeftDown, RightDown, Left, or Right, then the glyph modification module 110 may apply the delta value to a common point of the current segment and the next segment by subtracting the delta value from an x-coordinate of the common point.

In an example in which the glyph modification module 110 determines that the current segment's direction is Down, LeftDown, or RightDown, then there is a risk of creating overlaps or kinks in an outline of a modified glyph if the next segment's direction is Up, LeftUp, or RightUp. To avoid this, the glyph modification module 110 can be implemented to use the theorem of intersecting lines to identify a point at which the current segment and the next segment intersect. In this way, the glyph modification module 110 may change a y-coordinate of a common point between the current segment and the next segment based on the identified point of intersection to prevent the creation of the overlaps or kinks. In other words, changing the y-coordinate of the common point between the current segment and the next segment can prevent the overlaps and kinks.

In one example, the glyph modification module 110 can determine whether a current segment's direction is Left or Right. In response to determining that the current segment's direction is Left or Right, the glyph modification module 110 may be implemented to determine a direction of a next segment. If the glyph modification module 110 determines that the current segment's direction is Left or Right, and if the direction of the next segment is Up, LeftUp, or RightUp, then the glyph modification module 110 can be implemented to add the delta value to an x-coordinate of a point common to the current segment and the next segment. If the glyph modification module 110 determines that the current segment's direction is Left or Right, and if the direction of the next segment is Down, LeftDown, or RightDown, then the glyph modification module 110 can be implemented to subtract the delta value from the x-coordinate of the point common to the current segment and the next segment.

As shown in FIG. 5, the glyph modification module 110 may apply the delta value to points of the unmodified glyph 502 to increase or decrease a thickness of the vertical stem of the unmodified glyph 502. This functionality is illustrated as a modified glyph having increased horizontal weight 504 and as a modified glyph having decreased horizontal weight 506. As illustrated, the modified glyph having increased horizontal weight 504 has a thicker vertical stem than the unmodified glyph 502 and the modified glyph having decreased horizontal weight 506 has a thinner vertical stem than the unmodified glyph 502. Although illustrated as increasing or decreasing a thickness of a single vertical stem in this example, the glyph modification module 110 may be implemented to increase or decrease a thickness of multiple vertical stems such as to increase or decrease a thickness of all vertical stems of a glyph.

Figure 6A:
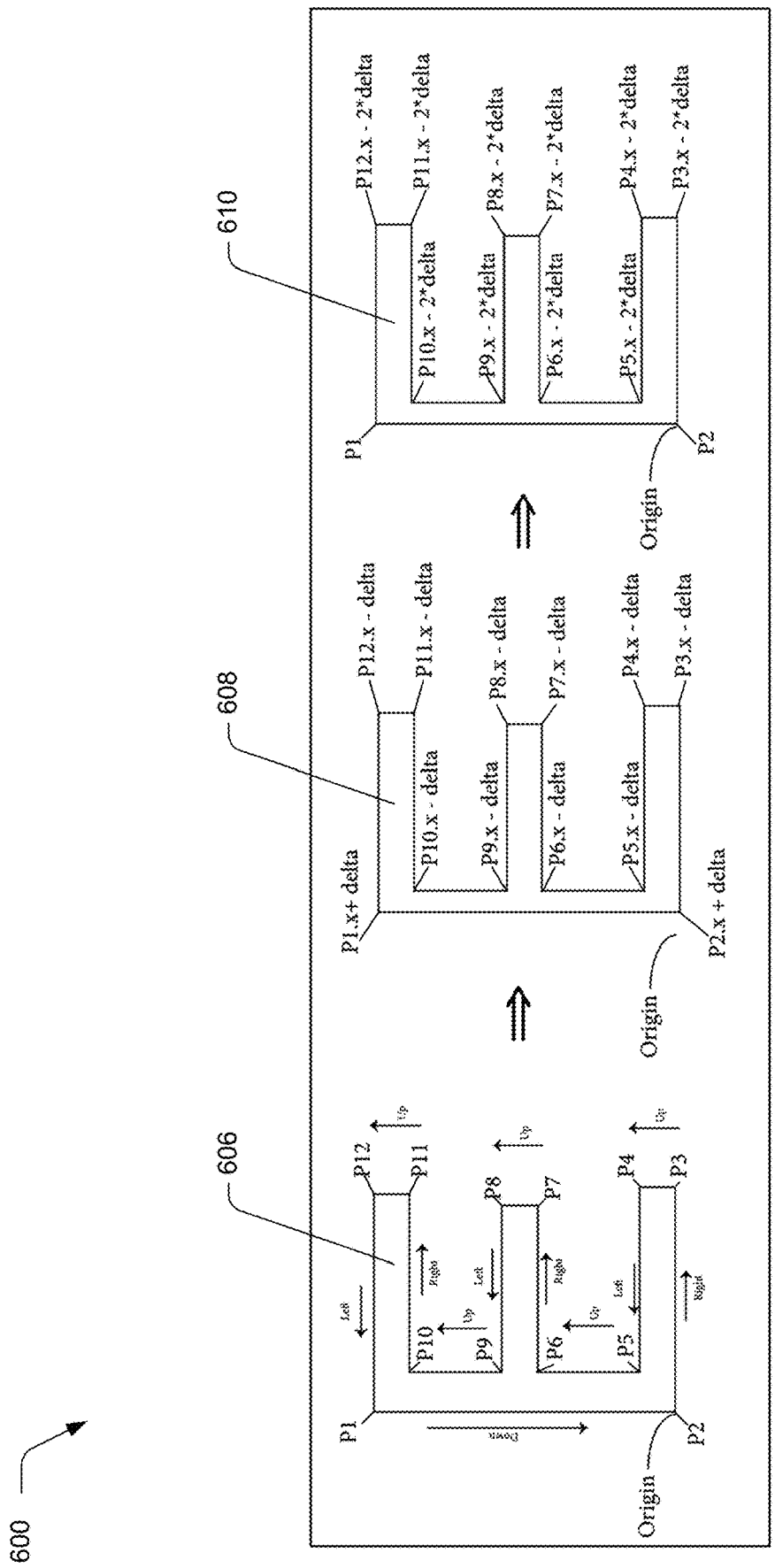
FIGS. 6A-6C are illustrations depicting example representations of aspects of modifying horizontal weight.
Figure 6B:
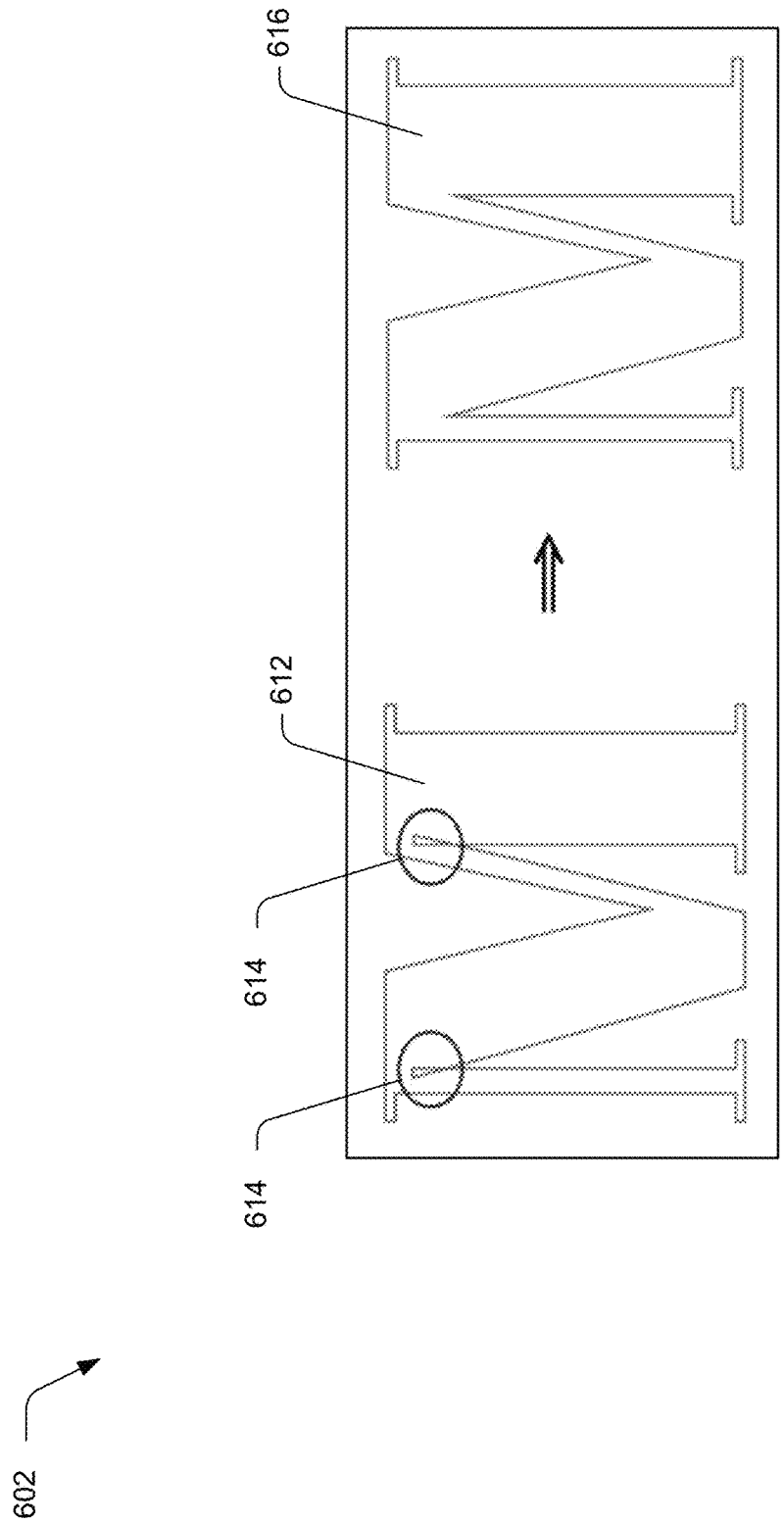
Figure 6C:
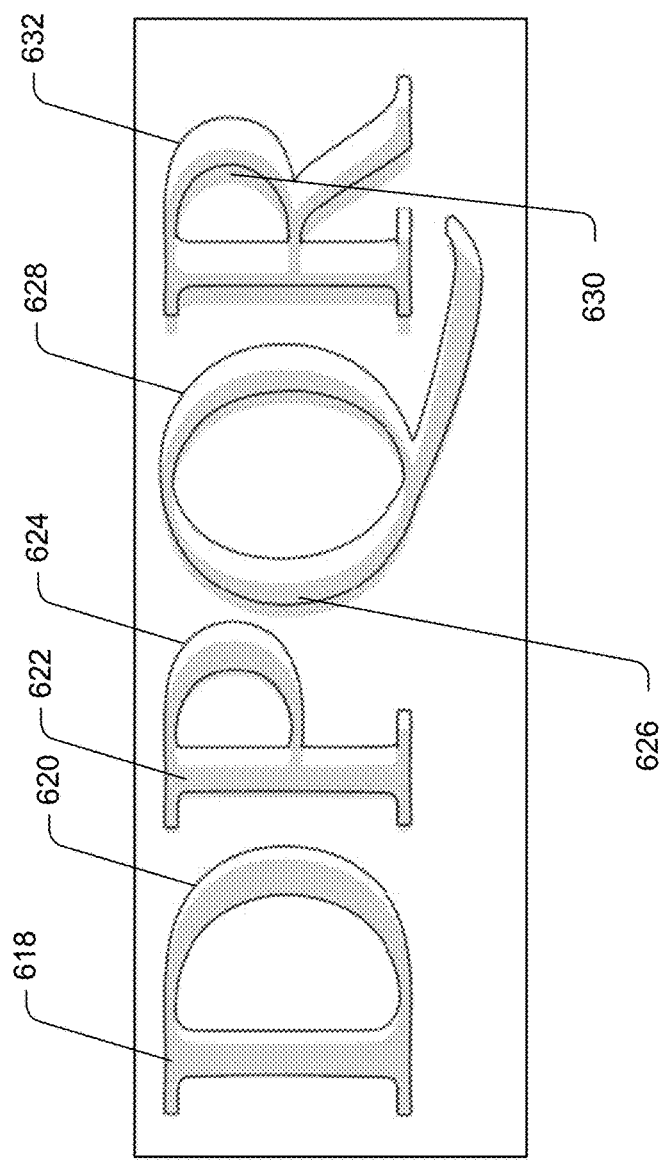

FIGS. 6A-6C are illustrations depicting example representations of aspects of modifying horizontal weight. FIG. 6A illustrates an example 600 of changing an origin of a modified glyph to maintain an origin of an unmodified glyph. FIG. 6B illustrates an example 602 of removal of overlaps in a modified glyph. FIG. 6C illustrates an example 604 of original glyphs and subsequent glyphs shifted due to increased advanced-width.

As shown in FIG. 6A, the example 600 includes an unmodified glyph 606 as well as a modified glyph 608 which has a reduced horizontal weight relative to the unmodified glyph 606. As illustrated, the delta value has been added to x-coordinates of points P1 and P2 causing the vertical stem of the modified glyph 608 to shift in the x-direction by the delta value. As described above, the delta value has been subtracted from x-coordinates of points P3-P12. The example 600 also illustrates a modified glyph having a changed origin 610 to maintain the origin of the unmodified glyph 606. As illustrated, the delta value is subtracted from points P1-P12 which maintains the origin of the unmodified glyph 606. In an example in which the modified glyph 608 has an increased horizontal weight, the origin may be maintained similarly by adding the delta value to points P1-P12.

As shown in FIG. 6B, the example 602 includes a modified glyph 612 which has overlaps 614. These overlaps 614 can be removed by using the theorem of intersecting lines to identify a point in which the segments of the modified glyph 612 intersect and changing y-coordinates of points to remove the overlaps 614. This is illustrated as a modified glyph without overlaps 616.

FIG. 6C illustrates an example 604 of glyphs with increased horizontal weight which appear shifted relative to original glyphs due to increased advanced width. As shown, a first original glyph 618 appears shifted relative to a modified first original glyph 620 having increased horizontal weight. A second original glyph 622 also appears shifted relative to a modified second original glyph 624. The second original glyph 622 appears to be further shifted relative to the modified second original glyph 624 than the first original glyph 618 appears relative to the modified first original glyph 620 due to increased advanced width. A third original glyph 626 appears shifted relative to a modified third original glyph 628 having increased horizontal weight. The third original glyph 626 appears further shifted relative to the modified third original glyph 628 than the second original glyph 622 appears relative to the modified second original glyph 624 due to increased advanced width. A fourth original glyph 630 appears shifted relative to a modified fourth original glyph 632 having increased horizontal weight. As shown in FIG. 6C, the fourth original glyph 630 appears further shifted relative to the modified fourth original glyph 632 than the third original glyph 626 appears relative to the modified third original glyph 628 due to increased advanced width.

Figure 7:
FIG. 7 is an illustration depicting example representations of horizontal weight modification.

FIG. 7 is an illustration depicting example representations 700 of horizontal weight modification. As shown in FIG. 7, the example representations 700 include example representation 702 which illustrates glyphs with no horizontal weight modification. Example representation 704 illustrates the glyphs of example representation 702 modified with decreased horizontal weight, e.g., negative 20 percent horizontal weight. As illustrated, vertical stems of example representation 704 have a decreased thickness relative to vertical stems of example representation 702. Example representation 706 illustrates the glyphs of example representation 702 modified with increased horizontal weight, e.g., positive 25 percent horizontal weight. As shown, vertical stems of example representation 706 have increased thickness relative to the vertical stems of example representation 702.

Direction Based Example for Modifying Vertical Weight

Figure 8:
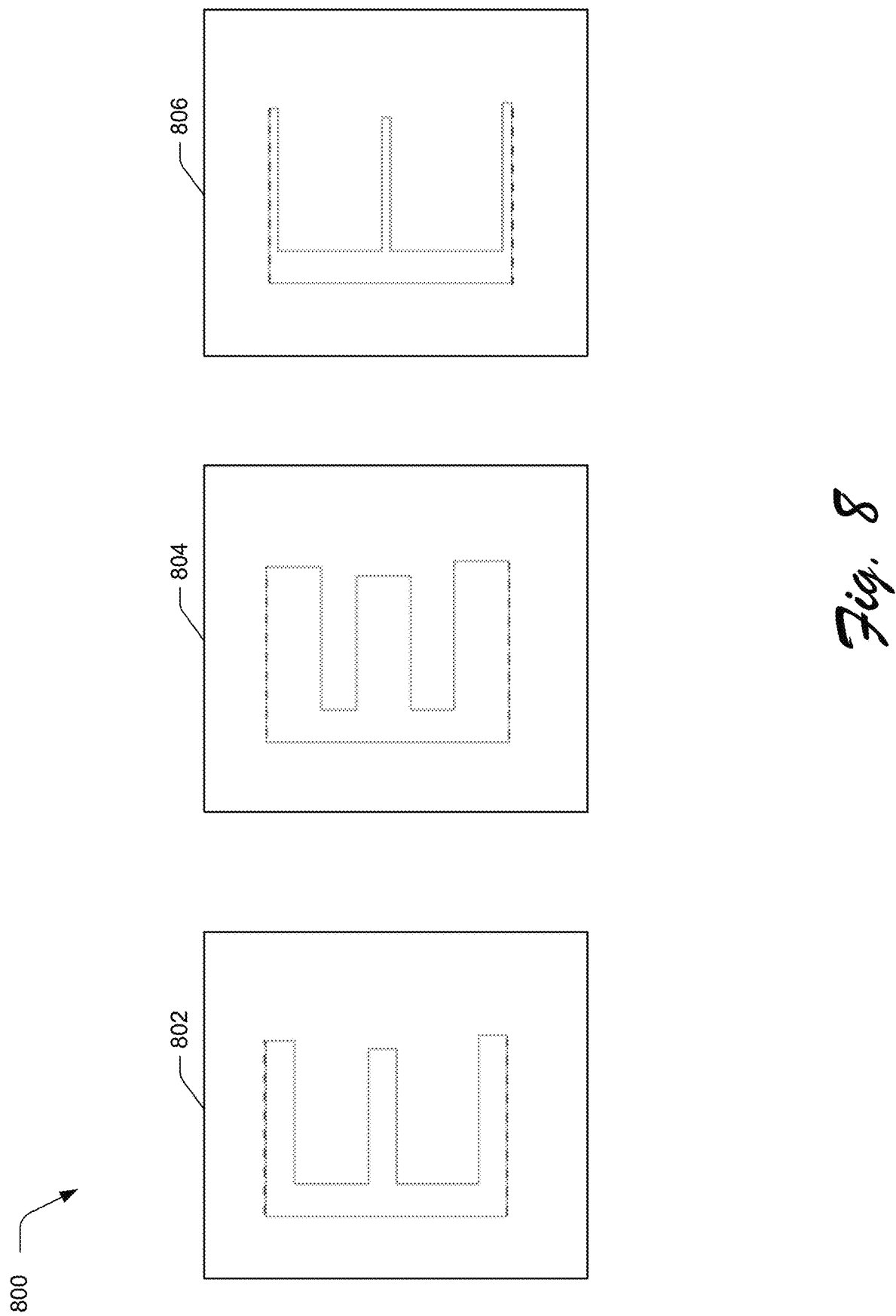
FIG. 8 is an illustration depicting an example representation of generating modified glyphs by modifying vertical weight.

FIG. 8 is an illustration depicting an example representation 800 of generating modified glyphs by modifying vertical weight. As shown in FIG. 8, the representation 800 includes an unmodified glyph 802. As described previously, modifying vertical weight changes a thickness of horizontal bars of a glyph. In one example, this may be accomplished by leveraging segment directions and common points of segments such as those illustrated in the representation 404 of the glyph 402.

Consider an example in which an indication of a property of the unmodified glyph 802 to modify included in the input data 118 is vertical weight and the quantification of the amount by which to modify the vertical weight is expressed as a percentage of a stroke height of a horizontal bar of the unmodified glyph 802 such that a positive percentage corresponds to an increase in the stroke height of the horizontal bar and a negative percentage corresponds to a decrease in the stroke height of the horizontal bar. A modification value for the horizontal bar may be expressed as:

$$\text{delta} = \frac{[(\text{modified stroke height}) - (\text{original stroke height})]}{2}$$

where: delta is a value to add to the top and bottom of the horizontal bar to modify the vertical weight of the horizontal bar; original stroke height is the stroke height of the horizontal bar of the unmodified glyph 802; and modified stroke height is the stroke height of the horizontal bar after applying a percentage increase or decrease to the original stroke height.

In one or more implementations, the computing device 102 may implement the glyph modification module 110 to apply the delta value to an outline of the unmodified glyph 802 based on directions of segments representing the outline of the unmodified glyph 802. For example, the glyph modification module 110 may be implemented apply the delta value to coordinates of points of the segments representing the outline of the unmodified glyph 802 based on directions of segments having the points. As illustrated in FIG. 4, each of the points P1-P12 belongs to at least two segments, and the glyph modification module 110 can apply the delta value to coordinates of the points P1-P12 based on directions of the segments having the points P1-P12. Since each of the points P1-P12 in this example represents a starting point of a first segment and an ending point of a second segment, the glyph modification module 110 may determine an application of the delta value to the coordinates of the points P1-P12 based on a current segment and a next segment. In this manner, any particular point of the points P1-P12 represents an endpoint of a current segment and a start point of a next segment.

In one example, the glyph modification module 110 may be implemented to determine whether a direction of a current segment is Left, LeftUp, or LeftDown. In response to determining that the direction of the current segment is Left, LeftUp, or LeftDown, the glyph modification module 110 may determine whether a direction of a next segment is Left, LeftUp, LeftDown, Up, or Down. If the direction of the current segment is Left, LeftUp, or LeftDown, and if the direction of the next segment is Left, LeftUp, LeftDown, Up, or Down, then the glyph modification module 110 may be implemented to add the delta value to a y-coordinate of a common point to the current segment and the next segment.

In one example, if the current segment's direction is Left, LeftUp, or LeftDown, and if the next segment's direction is Right, RightUp, or RightDown, then the glyph modification module 110 may prevent a segment from overlapping another segment of the segments representing the outline of the unmodified glyph 802. For example, it is possible in scenarios in which consecutive segments have opposite directions or opposite direction components that a delta value will be added to a first segment and the delta value will be subtracted from a second segment such as to overlap the segments. In other words, the effect of the application of the delta value can cause the first segment and the second segment to shift in opposing directions, and because the first segment and the second segment are consecutive segments, this scenario can create overlaps or kinks in an outline of a modified glyph. To avoid this, the glyph modification module 110 can be implemented to use the theorem of intersecting lines which is also referred to as the intercept theorem to identify a point at which the first segment and the second segment intersect. In this manner, the glyph modification module 110 may change an x-coordinate of a common point between the first segment and the second segment based on the identified point at which the first segment and the second segment intersect to prevent overlaps and kinks.

In another example, the glyph modification module 110 can be implemented to determine whether a direction of a current segment is Right, RightUp, or RightDown. In response to determining that the direction of the current segment is Right, RightUp, or RightDown, the glyph modification module 110 may determine whether a direction of a next segment is Right, RightUp, RightDown, Up, or Down. If the glyph modification module 110 determines that the direction of the current segment is Right, RightUp, or RightDown, and if the glyph modification module 110 determines that the direction of the next segment is Right, RightUp, RightDown, Up, or Down, then the computing device 102 can implement the glyph modification module 110 to subtract the delta value from a y-coordinate of a common point to the current segment and the next segment.

In another example, in response to determining that the direction of the current segment is Right, RightUp, or RightDown, the glyph modification module 110 may determine whether a direction of a next segment is Left, LeftUp, or LeftDown. If the glyph modification module 110 determines that the direction of the current segment is Right, RightUp, or RightDown, and if the glyph modification module 110 determines that the direction of the next segment is Left, LeftUp, or LeftDown, then the computing device 102 can implement the glyph modification module 110 to prevent kinks or overlaps by changing an x-coordinate of a point common to the current segment and the next segment using the theorem of intersecting lines. By changing the x-coordinate of the point common to the current segment and the next segment as well as subtracting the delta value from a y-coordinate of the common point, the glyph modification module 110 can be implemented to modify the unmodified glyph 802 without creating overlaps or kinks.

If the glyph modification module 110 determines that a direction of a current segment is Up or Down, and if the glyph modification module 110 determines that a direction of a next segment is Left, LeftUp, or LeftDown, then the glyph modification module 110 can be implemented to add the delta value to an y-coordinate of a common point to the current segment and the next segment. If the glyph modification module 110 determines that the direction of the current segment is Up or Down, and if the glyph modification module 110 determines that the direction of the next segment is Right, RightUp, or RightDown, then the glyph modification module 110 can be implemented to subtract the delta value from a y-coordinate of a common point to the current segment and the next segment.

As shown in FIG. 8, the glyph modification module 110 may apply the delta value to points of the unmodified glyph 802 to increase or decrease a thickness of the horizontal bars of the unmodified glyph 802. This functionality is illustrated as a modified glyph having increased vertical weight 804 and as a modified glyph having decreased vertical weight 606. As illustrated, the modified glyph having increased vertical weight 504 has thicker horizontal bars than the unmodified glyph 802 and the modified glyph having decreased vertical weight 506 has thinner horizontal bars than the unmodified glyph 502.

Figure 9:
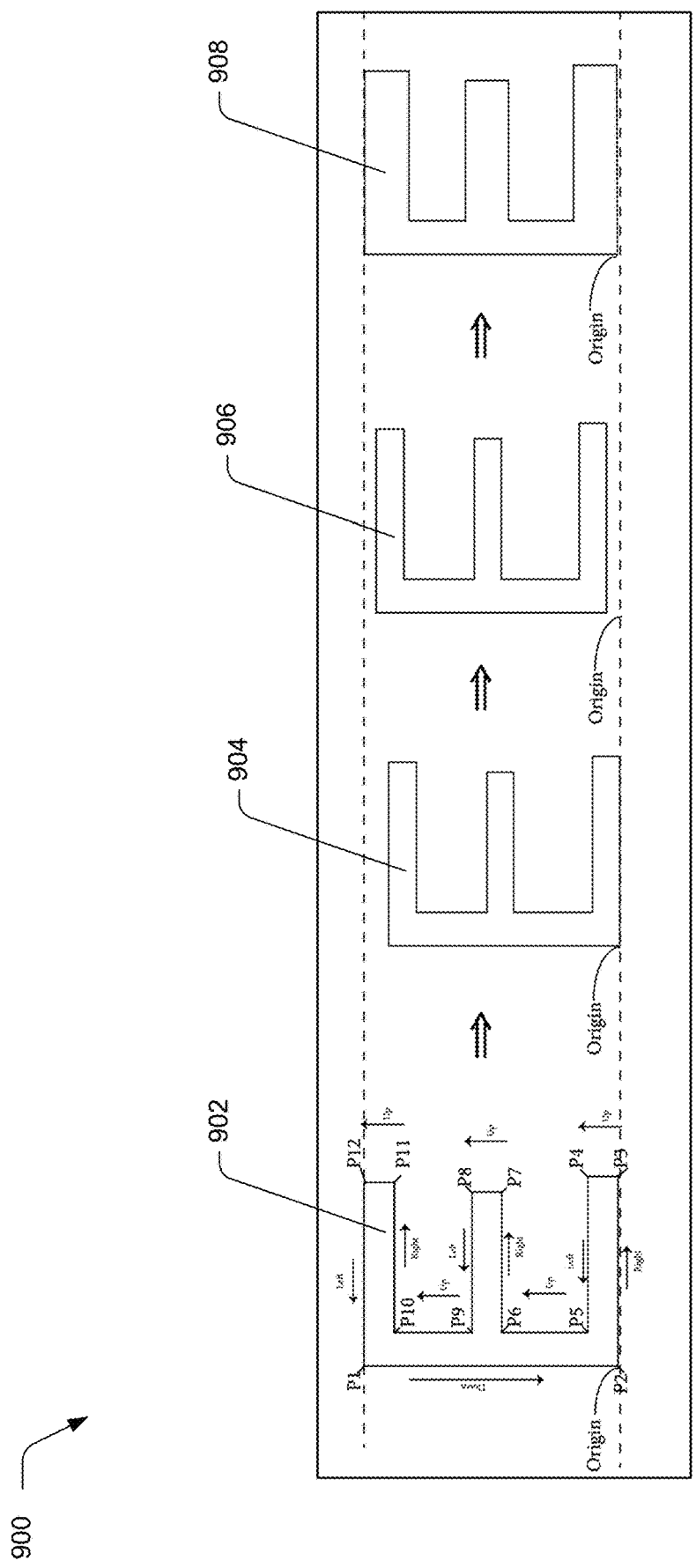
FIG. 9 is an illustration depicting an example representation of maintaining an origin and modifying vertical weight.

FIG. 9 is an illustration depicting an example representation 900 of maintaining an origin and modifying vertical weight. In some examples, modifying vertical weight of a glyph can change the glyph's baseline and a height of the glyph's bounding box. For example, increasing a vertical weight of the glyph can increase the height of the glyph's bounding box whereas decreasing a vertical weight of the glyph may decrease the height of the glyph's bounding box. As shown in FIG. 9, the representation 900 includes an unmodified glyph 902 which is represented as segments having directions. In order to maintain a baseline and a bounding box height of the unmodified glyph 902, the glyph modification module 110 may be implemented to scale the unmodified glyph 902 in a vertical direction by two times the delta value which is illustrated as a scaled glyph 904.

As illustrated, the scaled glyph 904 has been downscaled by two times the delta value which decreases a height of a bounding box of the scaled glyph 904 relative to the unmodified glyph 902. In one example, downscaling the unmodified glyph 902 may be performed by the glyph modification module 110 as part of increasing a vertical weight of the unmodified glyph 902. In another example, the glyph modification module 110 may be implemented to upscale the unmodified glyph 902 by two times the delta value as part of decreasing a vertical weight of the unmodified glyph 902.

As shown, the scaled glyph 904 is shifted away from the baseline of the unmodified glyph 902 by the delta value which is illustrated by a shifted glyph 906. In this manner, the glyph modification module 110 may be implemented to shift the scaled glyph 904 such that the shifted glyph is disposed a distance of the delta value from the baseline of the unmodified glyph 902. In one example, the glyph modification module 110 may shift the scaled glyph 904 to position the shifted glyph 906 a distance of the delta value from the height of the bounding box of the unmodified glyph 902. In this way, the glyph modification module 110 can position the shifted glyph 906 such that increasing a thickness of horizontal bars of the shifted glyph 906 by the delta value on the top and bottom of the horizontal bars will cause the shifted glyph 906 to have a baseline of the unmodified glyph 902 and a bounding box height of the unmodified glyph 902.

For example, the glyph modification module 110 may be implemented to increase a vertical weight of the shifted glyph 906 by adding the delta value to points of the segments based on segment directions and subtracting the delta value from points of the segments based on the segment directions. By modifying the vertical weight in this way, a modified glyph 908 maintains the origin and the bounding box height of the unmodified glyph 902. As illustrated in this example, the glyph modification module 110 increases the vertical weight of the unmodified glyph 902 by increasing a thickness of horizontal bars of the unmodified glyph 902 and generating the modified glyph 908 having the horizontal bars with increased thickness.

Although described as an example of increasing a vertical weight of the unmodified glyph 902, the vertical weight of the unmodified glyph may be similarly decreased. For example, the glyph modification module 110 can be implemented to decrease the vertical weight of the unmodified glyph 902 by upscaling the unmodified glyph in the vertical direction by two times the delta value and shifting an up scaled glyph by the delta value such that the scaled glyph is disposed a distance of the delta value from the baseline of the unmodified glyph 902. In this way, the shifted glyph is also disposed a distance of the delta value from the height of the unmodified glyph's 902 bounding box. In one example, the glyph modification module 110 can be implemented to decrease the vertical weight of the unmodified glyph 902 by adding the delta value to points of the segments based on segment directions and subtracting the delta value from points of the segments based on the segment directions.

Figure 10:
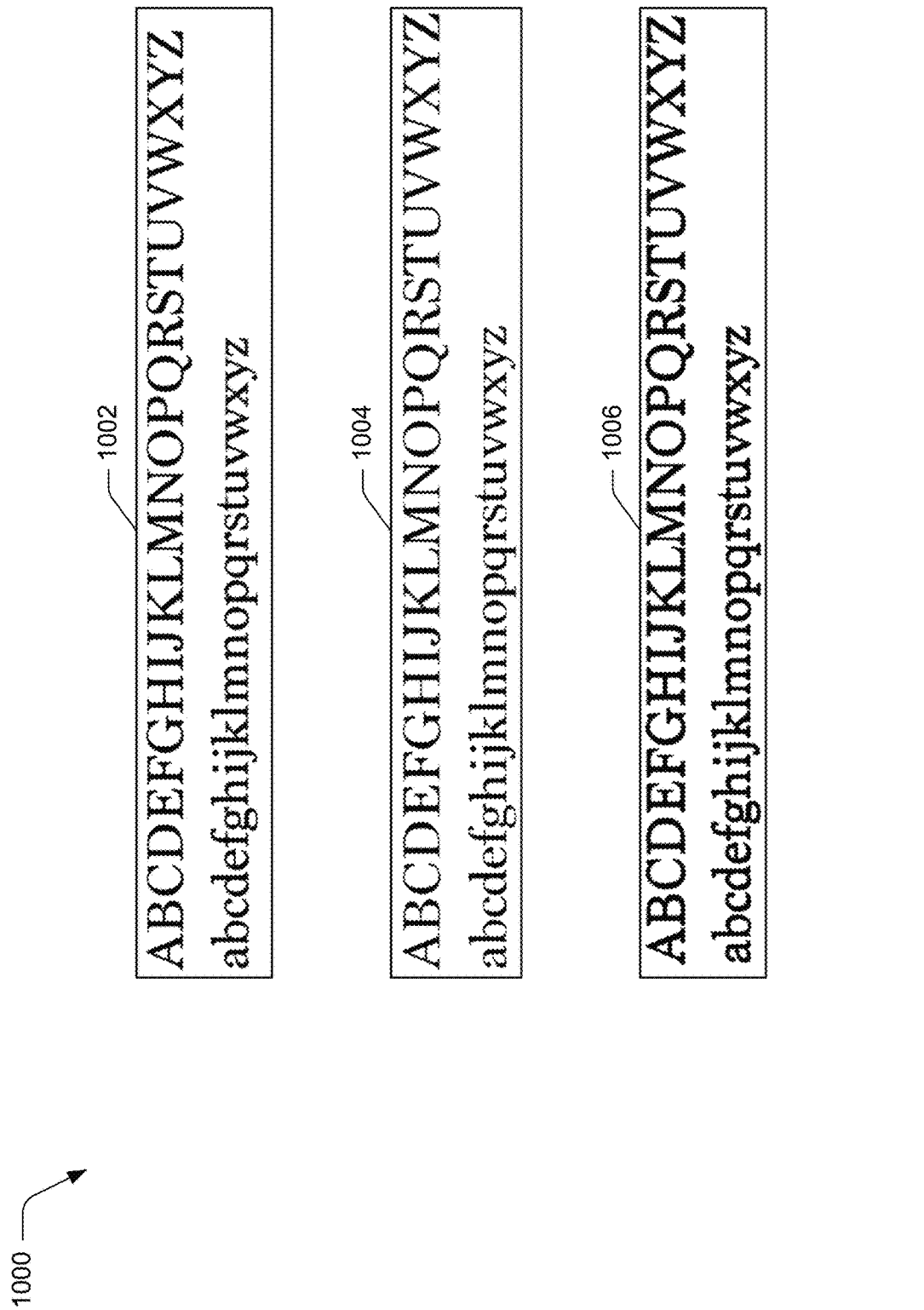
FIG. 10 is an illustration depicting example representations of vertical weight modification.

FIG. 10 is an illustration depicting example representations 1000 of vertical weight modification. As shown, the representations 1000 include example representation 1002 which illustrates glyphs having no vertical weight modification. Example representation 1004 illustrates the glyphs of representation 1002 having decreased vertical weight, e.g., negative 20 percent vertical weight. As illustrated, horizontal bars of glyphs in example representation 1004 have decreased thickness relative to horizontal bars of the glyphs in example representation 1002. Example representation 1006 illustrates the glyphs of example representation 1002 having increased vertical weight, e.g., positive 30 percent vertical weight. As shown, horizontal bars in example representation 1006 have increased thickness relative to the horizontal bars of the glyphs in example representation 1002.

Example of Modifying Overall Weight

Figure 11:
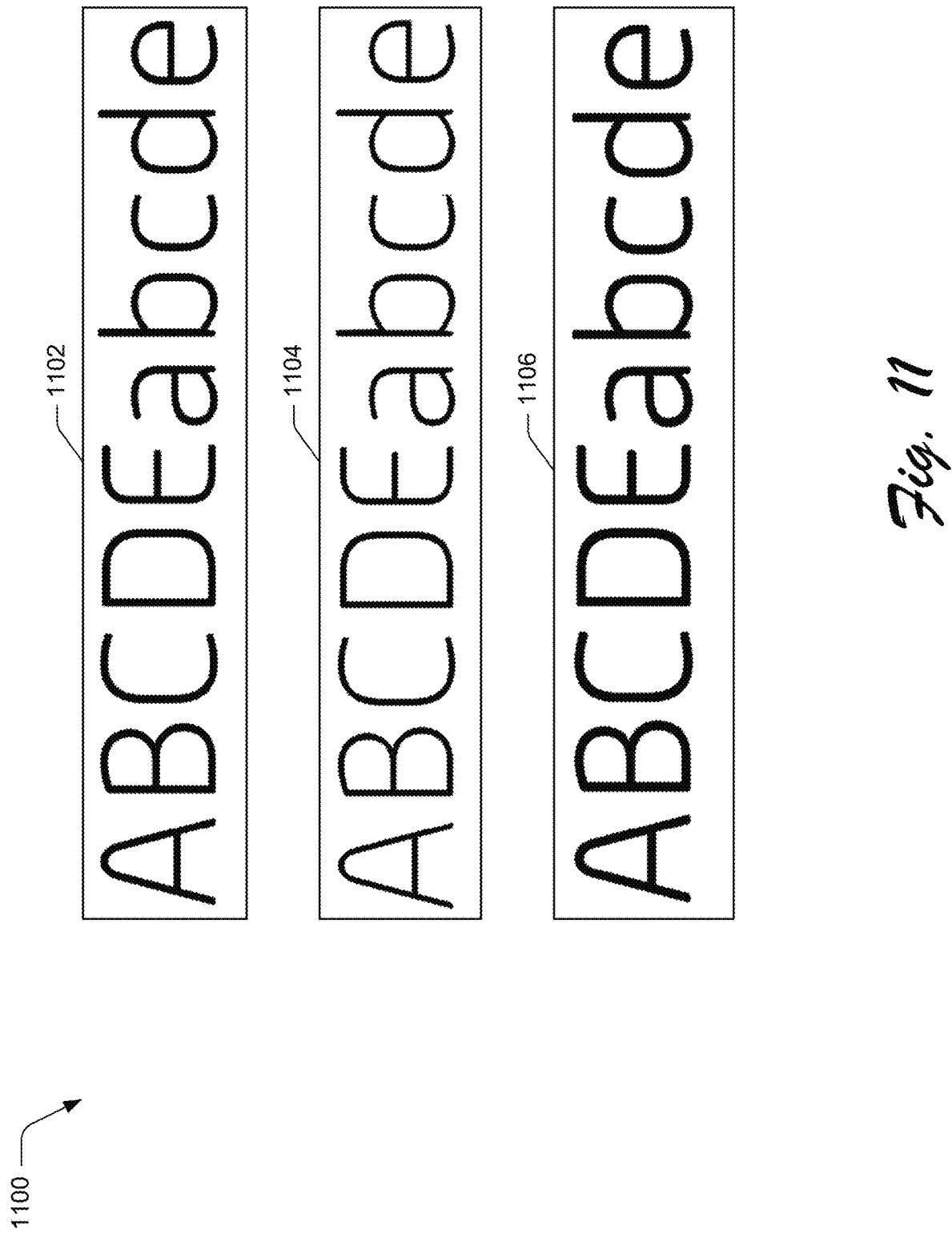
FIG. 11 is an illustration depicting example representations of overall weight modification.

FIG. 11 is an illustration depicting example representations 1100 of overall weight modification. By representing a glyph as segments having directions as illustrated in FIG. 4, the glyph modification module 110 can be implemented to increase or decrease a thickness of the glyph's vertical stems by modifying the glyph's horizontal weight. Additionally, the glyph modification module 110 may increase or decrease a thickness of the glyph's horizontal bars by modifying the glyph's vertical weight. In one or more implementations, the glyph modification module 110 can modify the glyph's vertical stems and modify the glyph's horizontal bars.

Consider an example in which the glyph modification module 110 is implemented to modify a glyph's horizontal weight and vertical weight simultaneously. In this example, the glyph modification module 110 can modify a glyph's overall weight by increasing or decreasing the glyph's horizontal weight and also by increasing or decreasing the glyph's vertical weight. As shown in FIG. 11, the representations 1100 include example representation 1102 which is illustrated as glyphs having no weight modification. Example representation 1104 illustrates the glyphs of representation 1102 having decreased overall weight, e.g., negative 20 percent weight modification. For example, representation 1104 includes the glyphs of representation 1102 having decreased horizontal weight and decreased vertical weight, e.g., negative 20 percent horizontal weight and negative 20 percent vertical weight. As illustrated, vertical stems and horizontal bars of glyphs in example representation 1104 have decreased thickness relative to vertical stems and horizontal bars of glyphs in example representation 1102.

Example representation 1106 illustrates the glyphs of representation 1102 having increased overall weight, e.g., positive 20 percent weight modification. For example, representation 1106 includes the glyphs of representation 1102 having increased horizontal weight and increased vertical weight, e.g., positive 20 percent horizontal weight and positive 20 percent vertical weight. As shown, vertical stems and horizontal bars of glyphs in representation 1106 have increased thickness relative to the vertical stems and the horizontal bars of the glyphs in example representation 1102.

Although modification of overall weight is illustrated as modifying horizontal weight and vertical weight equally, the glyph modification module 110 can be implemented to modify glyph weight in a manner such that horizontal weight is modified to have an increased magnitude relative to vertical weight and/or in a manner in which vertical weight is modified to have an increased magnitude relative to horizontal weight. In one example, the glyph modification module 110 may be implemented to increase a weight of a glyph by increasing the glyph's horizontal weight by 20 percent and increasing the glyph's vertical weight by 10 percent. By way of example, the glyph modification module 110 may decrease a weight of a glyph by decreasing the glyph's horizontal weight by 30 percent and decreasing the glyph's vertical weight by 15 percent. In another example, the glyph modification module 110 can be implemented to increase the weight of the glyph by increasing the glyph's horizontal weight by 10 percent and increasing the glyph's vertical weight by 30 percent.

For example, the computing device 102 may implement the glyph modification module 110 to increase a glyph's vertical weight and decrease the glyph's horizontal weight. In one example, the glyph modification module 110 may decrease a glyph's vertical weight and increase the glyph's horizontal weight. In some examples, the glyph modification module 110 can modify horizontal weight and vertical weight such that a glyph's horizontal and vertical weight are inversely proportional. However, other implementations are contemplated, e.g., one of the glyph's horizontal or vertical weight can be increased and/or decreased linearly, exponentially, etc.

Example of Modifying Width

Figure 12:
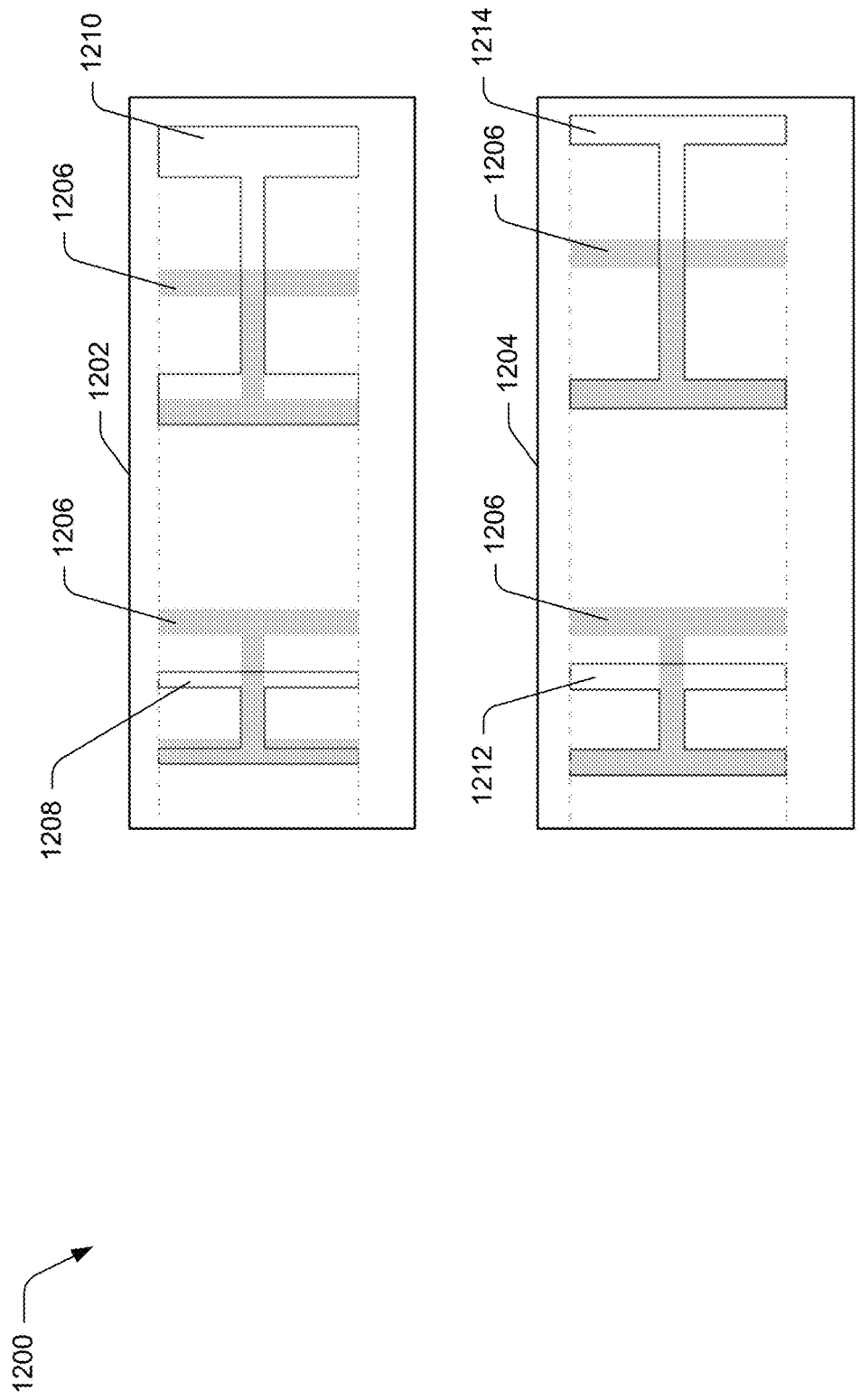
FIG. 12 is an illustration depicting an example representation of generating modified glyphs by modifying width.

FIG. 12 is an illustration depicting an example representation 1200 of generating modified glyphs by modifying width. As illustrated in FIG. 12, the representation 1200 includes illustrations of false or fake width modification 1202 and true width modification 1204. The fake width modification 1202 includes an unmodified glyph 1206 which is also included in the true width modification 1204. As shown in the fake width modification 1202, if the unmodified glyph 1206 is scaled horizontally, then a thickness of the unmodified glyph's 1206 vertical stems increases or decreases accordingly. This is illustrated by a fake condensed modification 1208 of the unmodified glyph 1206 and a fake extended modification 1210 of the unmodified glyph 1206.

To avoid increasing or decreasing the thickness of the vertical stems of the unmodified glyph 1206, the glyph modification module 110 can be implemented to modify a horizontal weight of the unmodified glyph 1206 or a corresponding modification of the unmodified glyph to preserve the vertical stem thickness of the unmodified glyph 1206. As illustrated in the true width modification 1204, a true condensed modification 1212 maintains the vertical stem thickness of the unmodified glyph 1206. The true width modification 1204 also shows that a true extended modification 1214 also maintains the vertical stem thickness of the unmodified glyph 1206.

Figure 13:
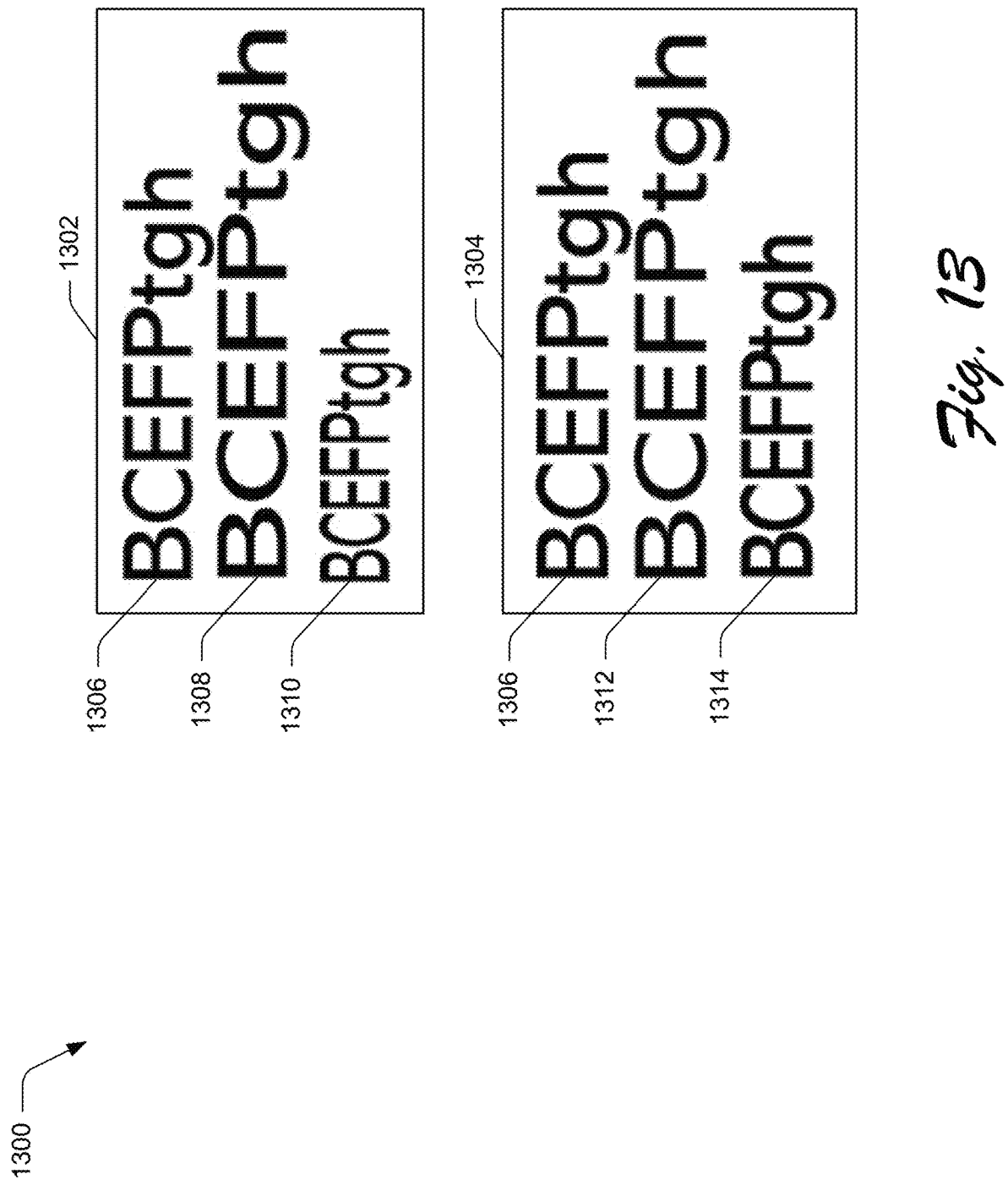
FIG. 13 is an illustration depicting example representations of width modification.

FIG. 13 is an illustration depicting example representations 1300 of width modification. The example representations 1300 are illustrated to include a false width modification example 1302 and a true width modification example 1304. Both the false width modification example 1302 and the true width modification example 1304 include unmodified glyphs 1306. The false width modification example 1302 also includes a false extended modification 1308 of the unmodified glyphs 1306 as well as a false condensed modification 1310 of the unmodified glyphs 1306.

As shown in FIG. 13, the true width modification example 1304 includes a true extended modification 1312 of the unmodified glyphs 1306 and a true condensed modification 1314 of the unmodified glyphs 1306. As further shown, the true extended modification 1312 maintains a vertical stem thickness of the unmodified glyphs 1306, and the true condensed modification 1314 also maintains the vertical stem thickness of the unmodified glyphs 1306. In this manner, the glyph modification module 110 can be implemented to generate false width modifications 1302 and/or true width modifications 1304 of the unmodified glyphs 1306.

Example of Modifying Capheight

Figure 14:
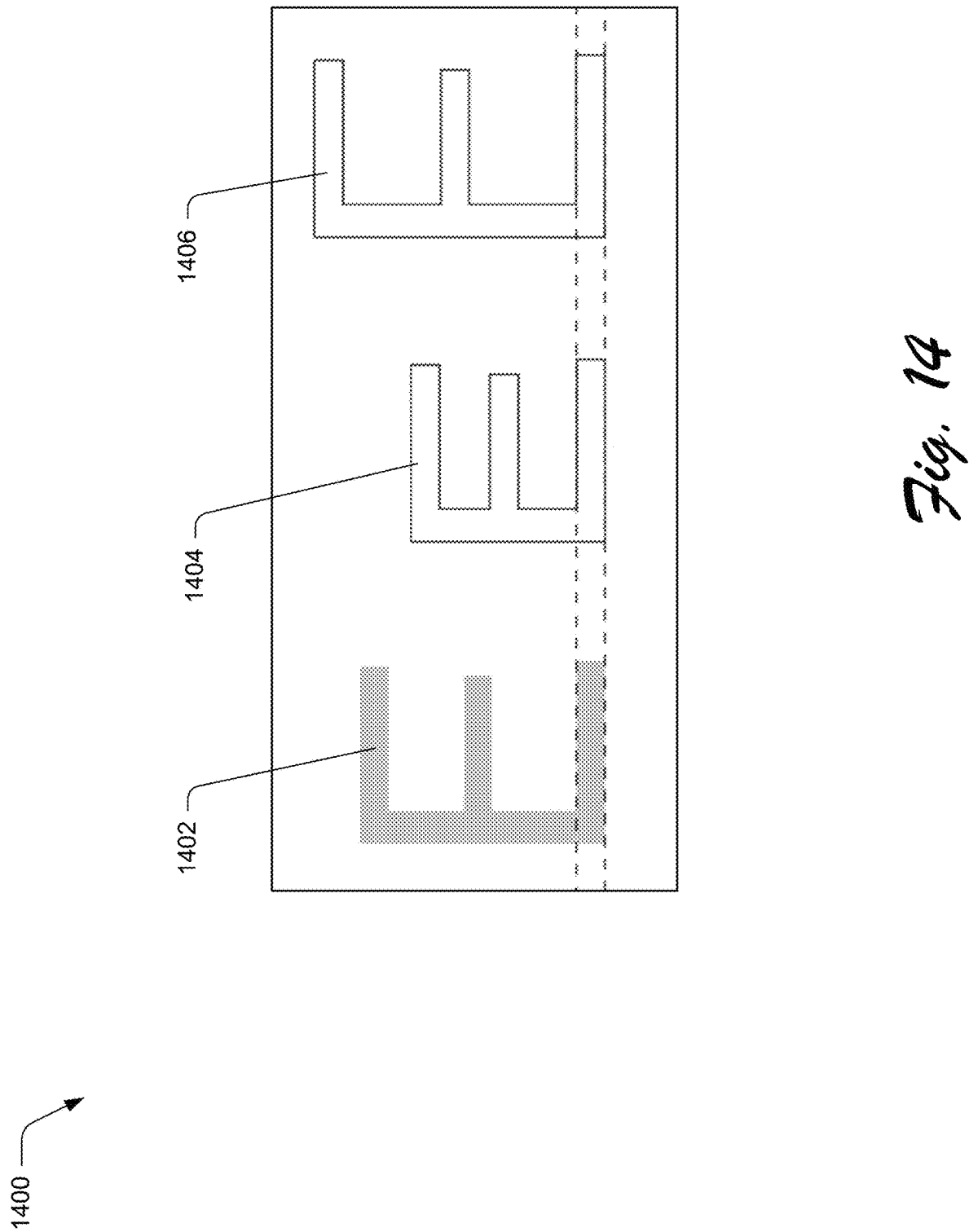
FIG. 14 is an illustration depicting an example representation of generating modified glyphs by modifying capheight.

FIG. 14 is an illustration depicting an example representation 1400 of generating modified glyphs by modifying capheight. The representation 1400 is illustrated to include an unmodified glyph 1402. In one or more implementations, the glyph modification module 110 can be implemented to generate small-cap glyphs and/or high-cap glyphs by modifying a capheight of the unmodified glyph 1402. For example, the glyph modification module 110 may scale the unmodified glyph 1402 in a vertical direction which also scales a thickness of horizontal bars of the unmodified glyph 1402. In one example, the glyph modification module 110 can maintain a thickness of the horizontal bars of the unmodified glyph 1402 by modifying a vertical weight of a scaled glyph to increase or decrease the thickness of the horizontal bars of the scaled glyph.

As shown in FIG. 14, the glyph modification module 110 can generate a small-cap glyph 1404 from the unmodified glyph 1402 by downscaling the unmodified glyph in a vertical direction and increasing a vertical weight of the downscaled glyph to maintain the thickness of the horizontal bars of the unmodified glyph 1402 in the generated small-cap glyph 1404. In this manner, the glyph modification module 110 may decrease a height of the unmodified glyph 1402 while maintaining the thickness of the horizontal bars of the unmodified glyph 1402 by increasing the vertical weight of the downscaled glyph. As illustrated, the glyph modification module 110 may be implemented to generate a high-cap glyph 1406 from the unmodified glyph 1402 by upscaling the unmodified glyph in a vertical direction and decreasing a vertical weight of the upscaled glyph. In this way, the glyph modification module 110 can increase a height of the unmodified glyph 1402 while maintaining the thickness of the horizontal bars of the unmodified glyph 1402 by decreasing the vertical weight of the upscaled glyph.

Figure 15:
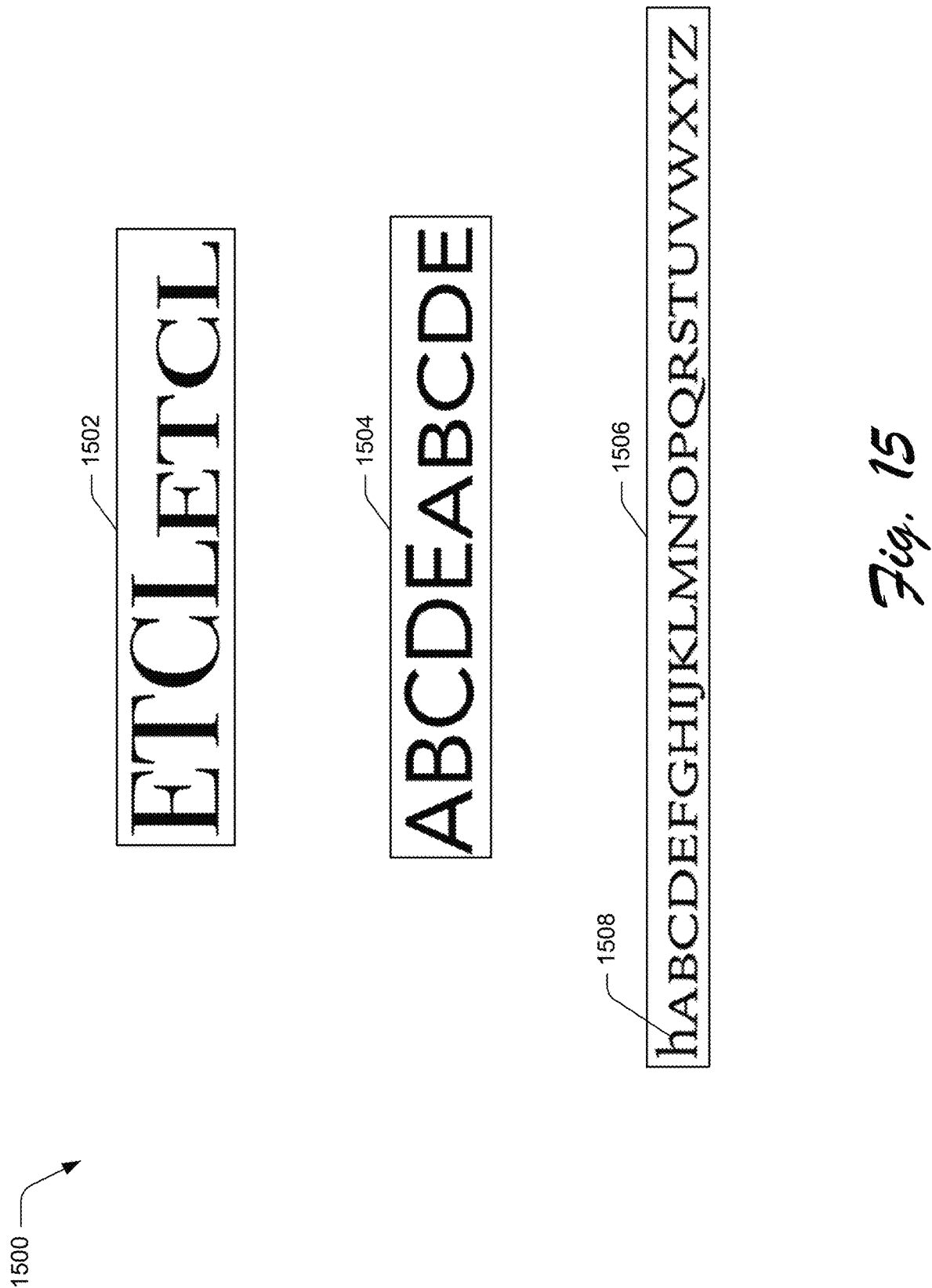
FIG. 15 is an illustration depicting example representations of capheight modification.

FIG. 15 is an illustration depicting example representations 1500 of capheight modification. The representations 1500 include example 1502 which illustrates small-cap glyphs (right) generated from unmodified glyphs (left). Example 1504 also illustrates small-cap glyphs (right) generated from unmodified glyphs (left). Example 1506 further illustrates generated small-cap glyphs as well as a first letter 1508 for reference.

Example of Modifying Xheight

Figure 16:
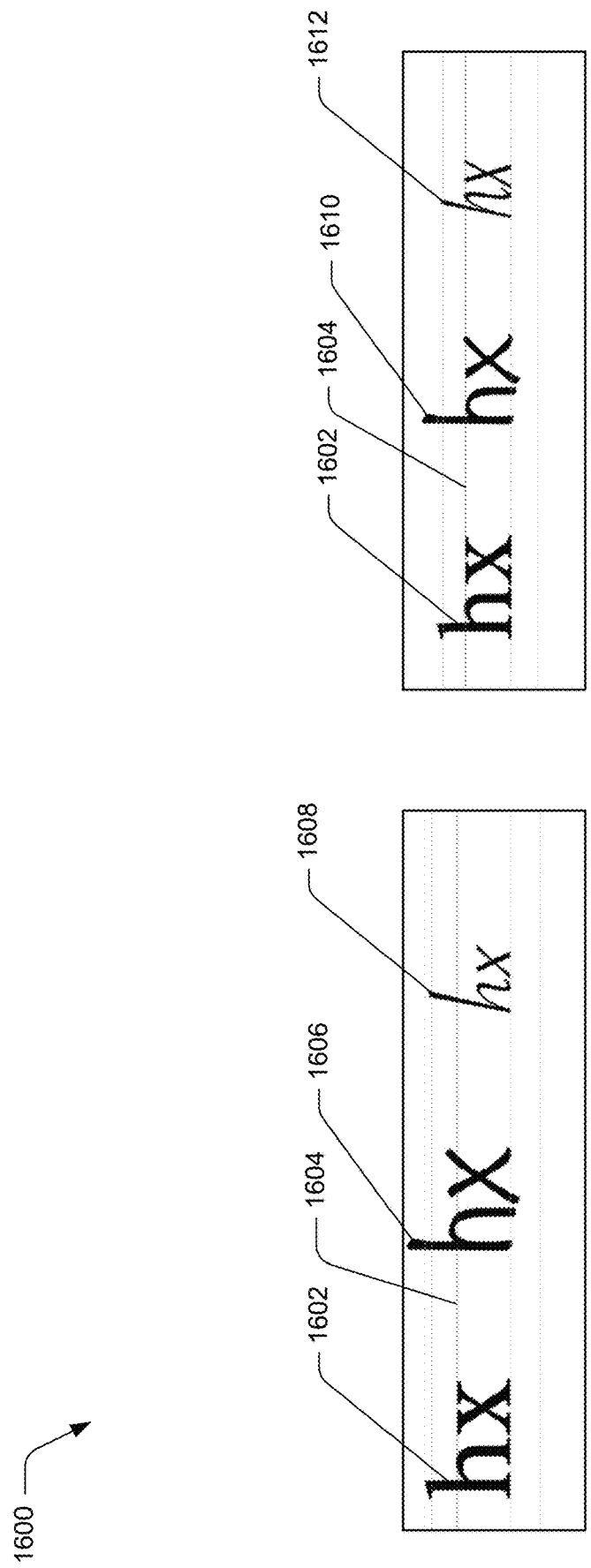
FIG. 16 is an illustration depicting an example representation of generating modified glyphs by modifying xheight.

FIG. 16 is an illustration depicting an example representation 1600 of generating modified glyphs by modifying xheight. By way of background, xheight is a distance between a baseline and a mean line of a lowercase letters in a typeface and xheight generally refers to the height of the lowercase letter 'x' in the typeface. As a result, xheight is a significant feature of typeface identification and readability. Typefaces having a large xheight relative to a total height of a font have relatively shorter ascenders and decenders and less white space between lines of glyphs of a font of a typeface.

In one or more implementations, the glyph modification module 110 can be implemented to modify xheight by identifying an xheight of a font. For example, OpenType fonts include the xheight of a font in the font's OS/2 table. In another example, if a font file does not include a font's xheight, then the glyph modification module 110 may compute xheight from a bounding box of a lowercase letter 'x' of a font where the height of 'x' is the font's xheight. Once the xheight is identified, the glyph modification module 110 may be implemented to scale points between the xheight and a baseline and the glyph modification module 110 can apply a vertical weight delta value to modify the horizontal bars to compensate for scaling the points.

In one example, the glyph modification module 110 can modify xheight by modifying points disposed between the identified xheight and a baseline. For each such point, this modification may be expressed as:

$$xheightFactor = \frac{(\text{requested } xheight)}{(xheight)}$$

$$DeltaY = P.y - \text{baseline}$$

$$pModified.y = \text{baseline} + xheightFactor * DeltaY$$

where: xheightFactor represents a scaling amount; P.y is a y-coordinate of the point; baseline is the baseline of a glyph; DeltaY is the distance from the baseline of the glyph; and pModified.y is a modified y-coordinate of the point. In an example where a font is italic with an 'angle,' the modification can be further expressed as:

$$p.Modified.x = P.x + \frac{(pModified.y - P.y)}{\tan(\text{angle})}$$

where: P.y is a y-coordinate of the point; pModified.y is a modified y-coordinate of the point; angle is the angle of the italic font; P.x is an x-coordinate of the point; and p.Modified.x is a modified x-coordinate of the point.

Continuing this example, the glyph modification module 110 can be implemented to apply the vertical weight delta value to compensate for the decrease in thickness of horizontal bars of the glyph. After applying the vertical weight delta value, the glyph modification module 110 can output modified points and generate xheight modification which can be expressed as:

$P.x = p\text{Modified}.x$ $P.y = p\text{Modified}.y$ where: P.x is the modified x-coordinate of the point; and P.y is the modified y-coordinate of the point.

As shown in FIG. 16, the representation 1600 is illustrated to include an input glyph set 1602 having a requested xheight 1604 as well as a first unmodified glyph set 1606 having a first xheight and a second unmodified glyph set 1608 having a second xheight. In one or more implementations, the glyph modification module 110 can be implemented to generate a first modified glyph set 1610 having the requested xheight 1604 by modifying the first unmodified glyph set 1606 and a second modified glyph set 1612 also having the requested xheight 1604 by modifying the second unmodified glyph set 1608.

Figure 17:
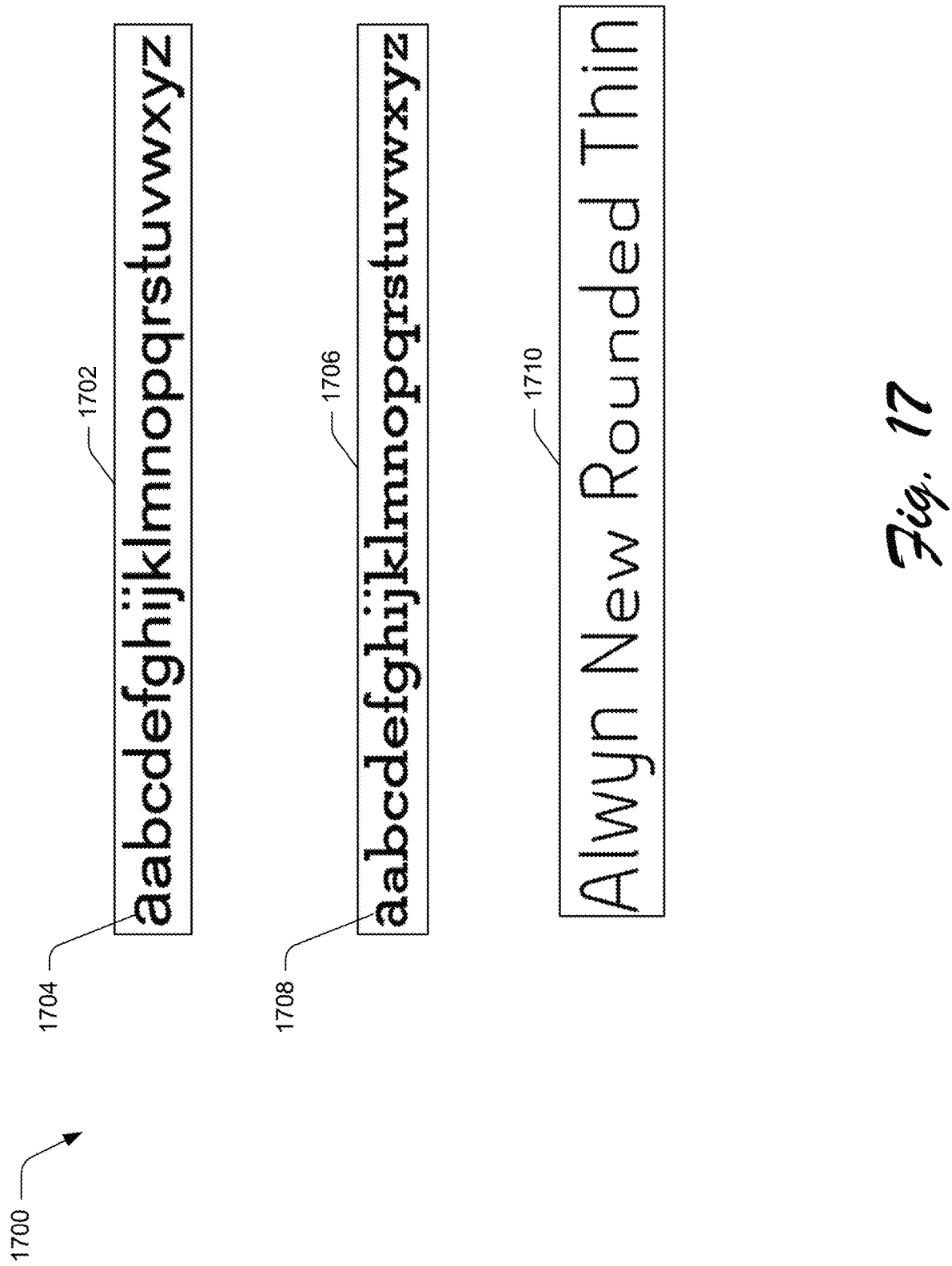
FIG. 17 is an illustration depicting example representations of xheight modification.

FIG. 17 is an illustration depicting example representations 1700 of xheight modification. As shown, the example representations 1700 include example 1702 which illustrates a generated low xheight which includes first letter 1704 for reference. Example 1706 illustrates another generated low xheight which includes first letter 1708 for reference. As illustrated, example 1710 illustrates generated different xheights.

Example of Modifying Ascent

Figure 18:
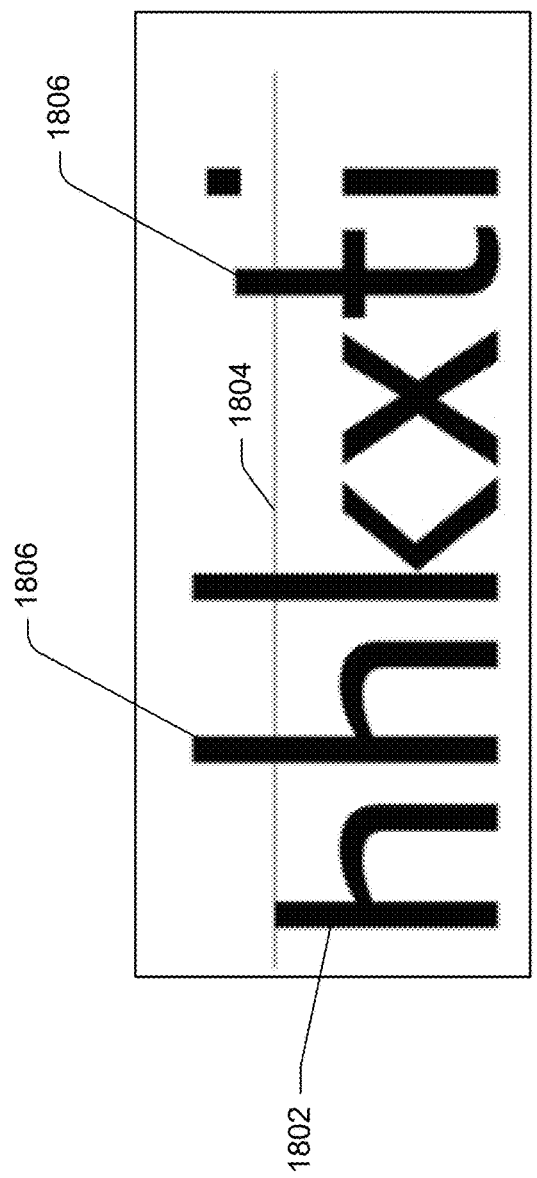
FIG. 18 is an illustration depicting an example representation of generating modified glyphs by modifying accent.

FIG. 18 is an illustration depicting an example representation 1800 of generating modified glyphs by modifying accent. By way of background, ascender generally is disposed between an xheight and an ascent of a glyph. In a manner similar to xheight modification described above, the glyph modification module 110 can be implemented to identify points disposed between an xheight line and an ascent line of a glyph. The glyph modification module 110 can be further implemented to scale the identified points, and compensate for such scaling by applying vertical weight to compensate for loss in stroke due to the scaling. As shown, the example representation 1800 includes a first letter 1802 for reference, an ascent line 1804, and an increased ascender height 1806.

Example of Modifying Descent

Figure 19:
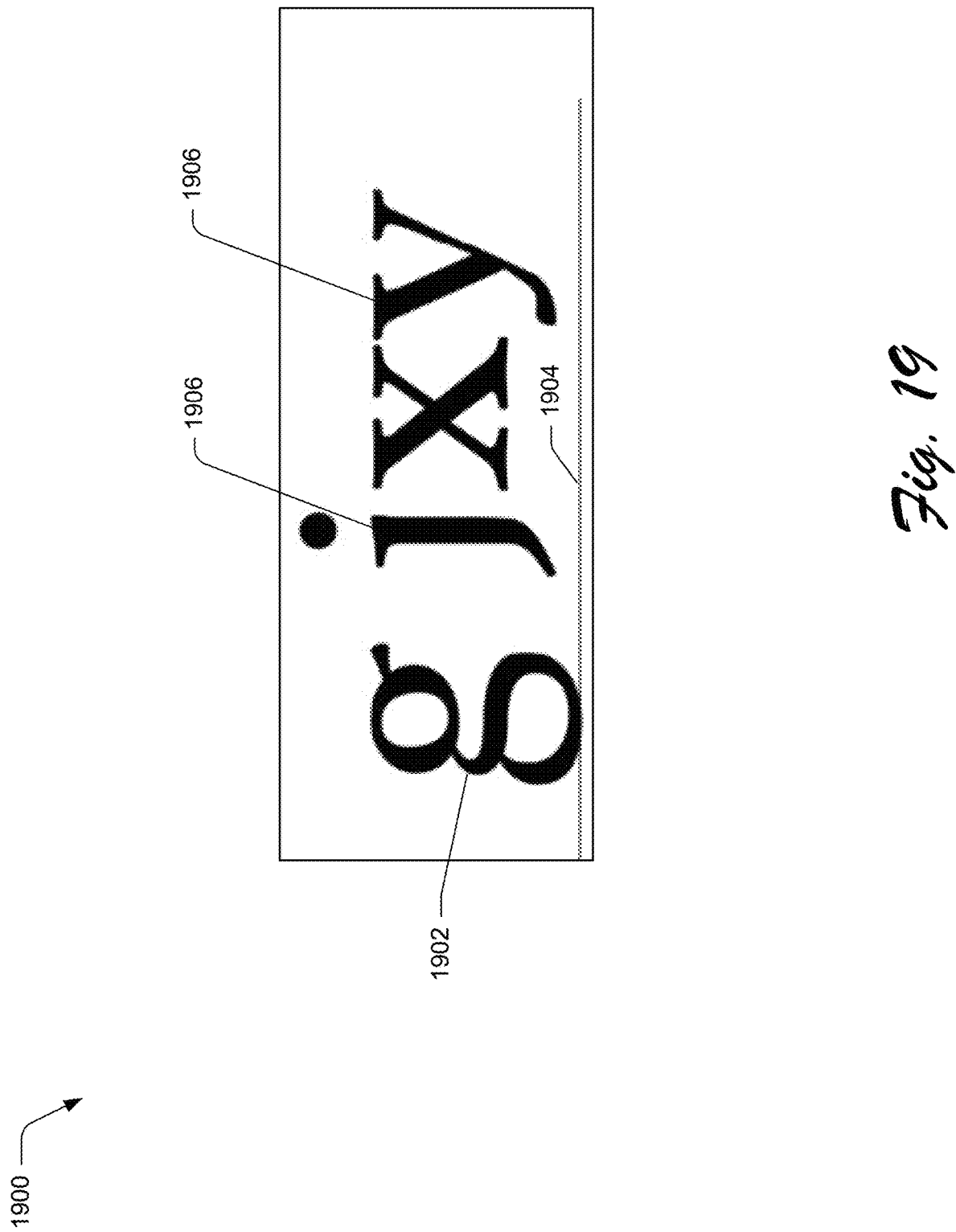
FIG. 19 is an illustration depicting an example representation of generating modified glyphs by modifying descent.

FIG. 19 is an illustration depicting an example representation 1900 of generating modified glyphs by modifying descent. By way of background, descender generally is disposed between a baseline and a decent of a glyph. In a manner similar to ascent modification described above, the glyph modification module 110 can be implemented to identify points disposed between a baseline and a descent line of a glyph. The glyph modification module 110 can be further implemented to scale the identified points, and compensate for such scaling by applying vertical weight to compensate for loss in stroke due to the scaling. As shown, the example representation 1900 includes a first letter 1902 for reference, a descent line 1904, and a decreased descender height 1906.

Example of Generating New Composite Glyphs

Figure 20:
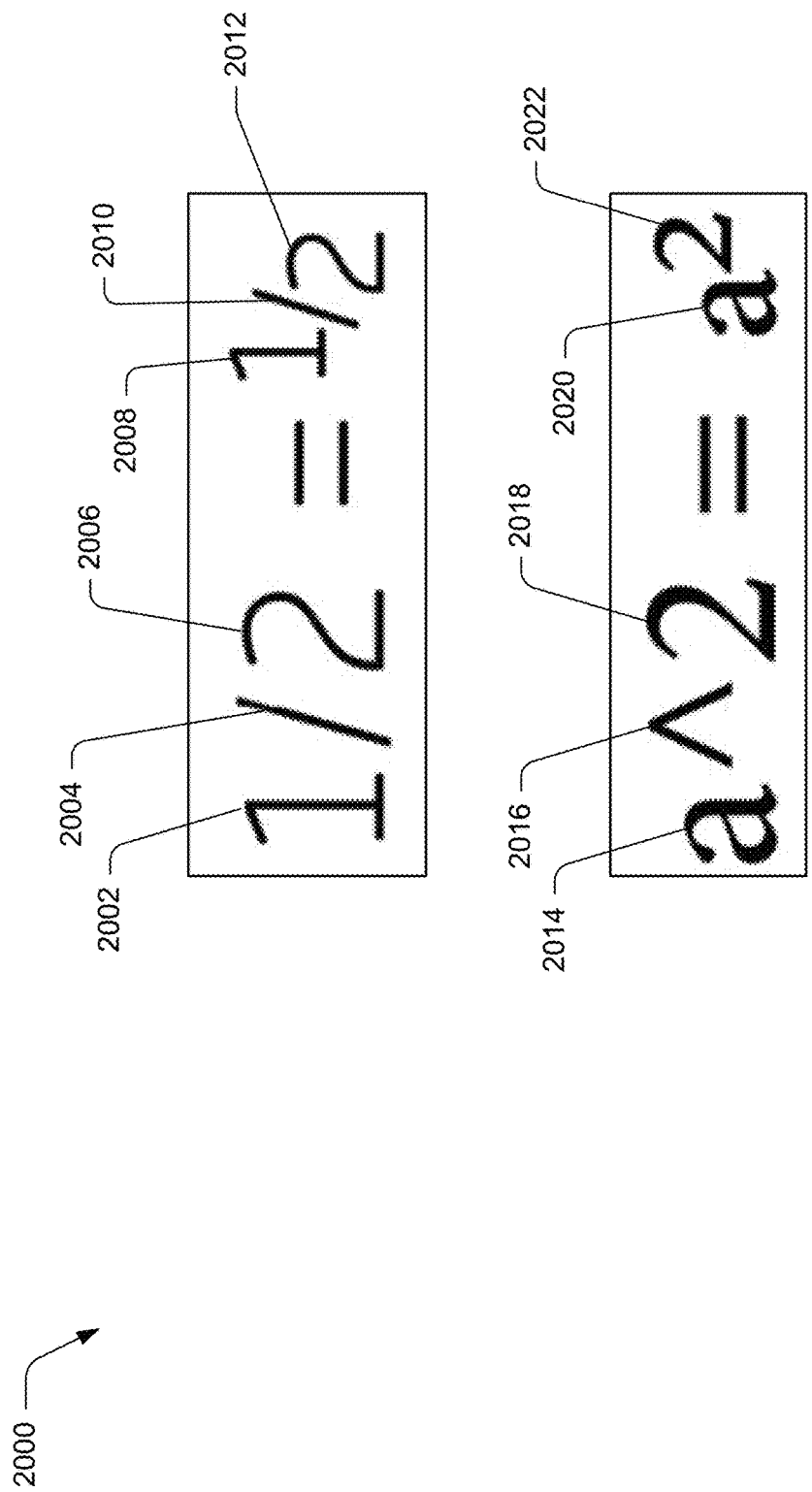
FIG. 20 is an illustration depicting an example representation of generating composite glyphs by modifying glyph weight.

FIG. 20 is an illustration depicting an example representation 2000 of generating composite glyphs by modifying glyph weight. As illustrated in FIG. 20, the representation 2000 includes a first glyph 2002, a second glyph 2004, and a third glyph 2006 oriented such that the glyphs 2002-2006 are aligned horizontally. In one or more embodiments, the glyph modification module 110 may be implemented to modify the glyphs 2002-2006 by scaling the glyphs and modifying horizontal and/or vertical weight to generate a first modified glyph 2008, a second modified glyph 2010, and a third modified glyph 2012. As shown, the glyphs 2008-2012 resemble the glyphs 2002-2006 and the glyphs 2008-20012 are oriented such that the glyphs 2008-2012 are aligned diagonally.

In another example, the representation 2000 also includes a first glyph 2014, a second glyph 2016, and a third glyph 2018. As shown, the glyphs 2014-2018 are oriented to illustrate a mathematical relationship. In the illustrated example, the glyph modification module 110 has scaled the glyphs 2014 and 2018 and modified horizontal and/or vertical weight to generate a first modified glyph 2020 and a third modified glyph 2022 such that the second glyph 2016 has been removed and the modified glyphs 2020 and 2022 illustrate the same mathematical relationship in a different manner.

Example of Modifying Slant Angle

Figure 21:
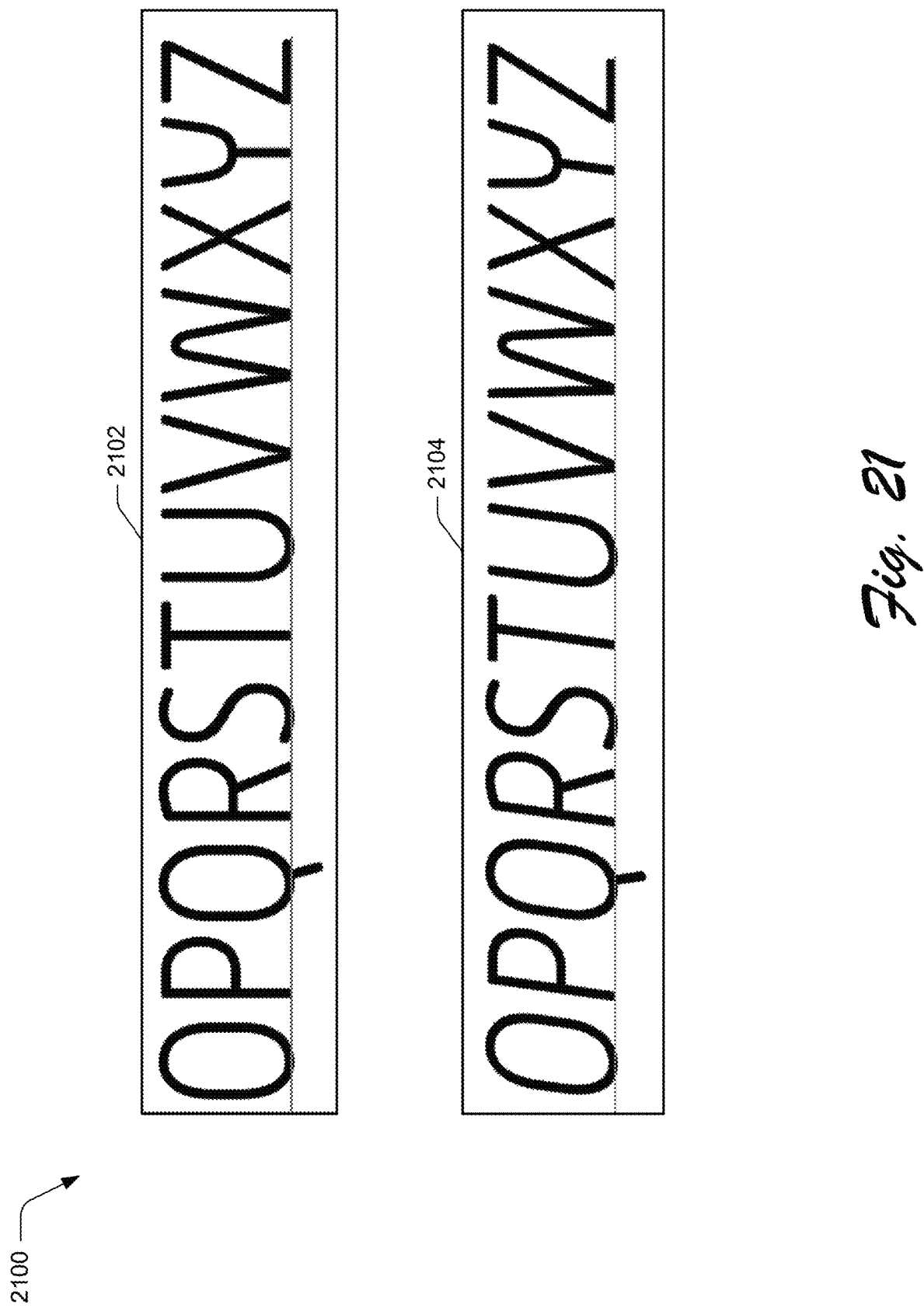
FIG. 21 is an illustration depicting an example representation of generating modified glyphs by modifying slant angle.

FIG. 21 is an illustration depicting an example representation 2100 of generating modified glyphs by modifying slant angle. By way of background, oblique and italic transformations are different in that oblique fonts are generated by applying simple mathematical operations to a font but italic transformation can be different for each individual glyph. By way of further background, italic lowercase is generally slanted, condensed, and has small x-height. Italic uppercase is generally slanted and condensed. Against this background, the glyph modification module 110 may be implemented to combine aspects of the described techniques herein to modify a slant angle of a glyph. As illustrated in FIG. 21, the representation includes glyphs without a slant angle 2102. In this manner, the glyph modification module 110 can modify the glyphs without a slant angle 2102 to generate glyphs having a slant angle 2104.

Example of Modifying Contrast

Figure 22:
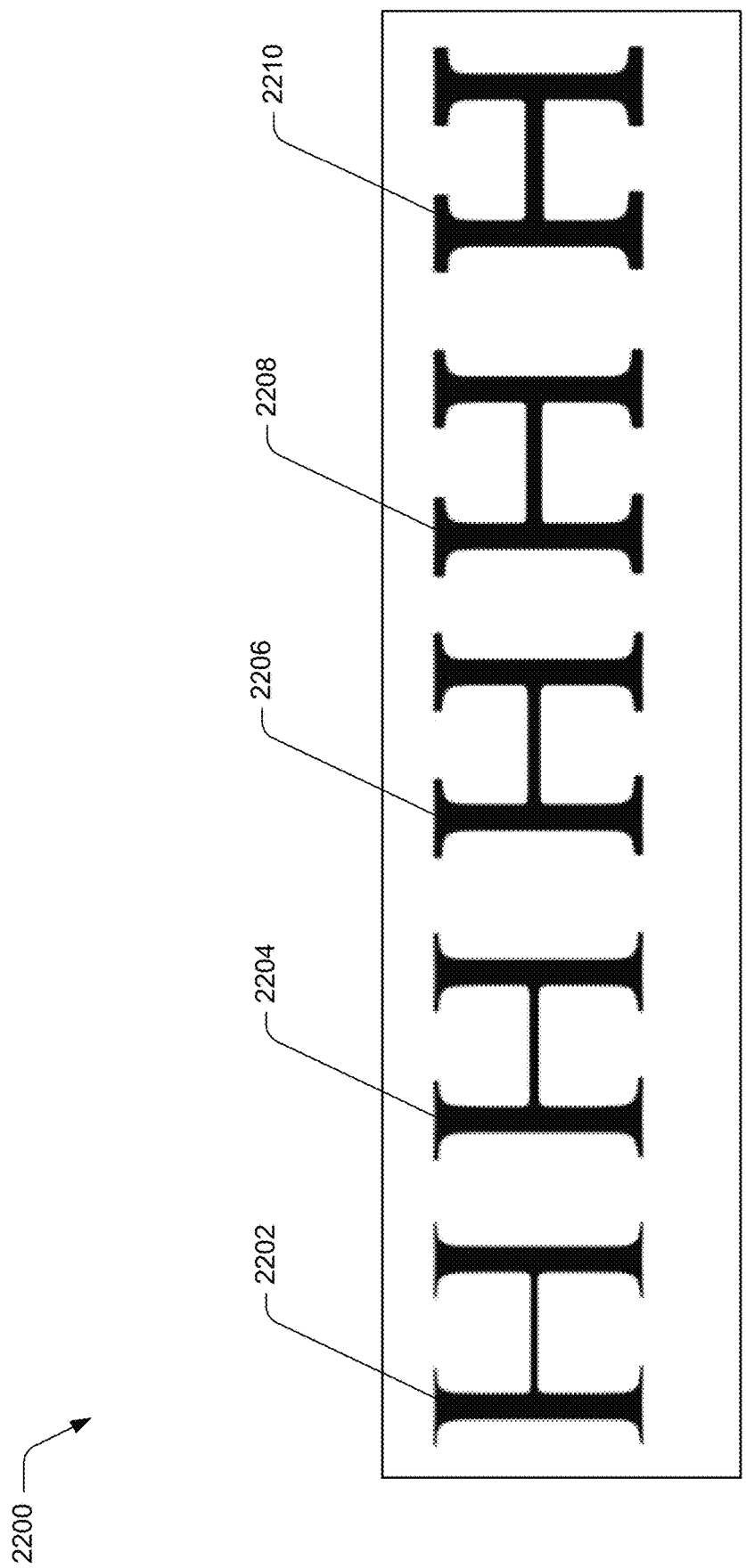
FIG. 22 is an illustration depicting an example representation of generating modified glyphs by modifying contrast.

FIG. 22 is an illustration depicting an example representation 2200 of generating modified glyphs by modifying contrast. In some examples, the glyph modification module 110 may be implemented to modify a contrast by modifying vertical weight and/or horizontal weight. An example of which is shown as a lowest contrast glyph 2202. The glyph modification module 110 can generate a glyph having increased contrast 2204 which is illustrated in FIG. 22 by modifying the lowest contrast glyph 2204. The glyph modification module 110 can further generate a glyph having further increased contrast 2206 by modifying the lowest contrast glyph 2202 and/or modifying the glyph having increased contrast 2204. In some examples, the glyph modification module 110 may generate a high contrast glyph 2208 by modifying the lowest contrast glyph 2202 and/or the glyph having increased contrast 2204 and/or the glyph having further increased contrast 2206. In other examples, the glyph modification module 110 can generate a highest contrast glyph 2210 such as by modifying the lowest contrast glyph 2202 and/or the glyph having increased contrast 2204 and/or the glyph having further increased contrast 2206 and/or the high contrast glyph 2208.

Example User Interface

Figure 23:
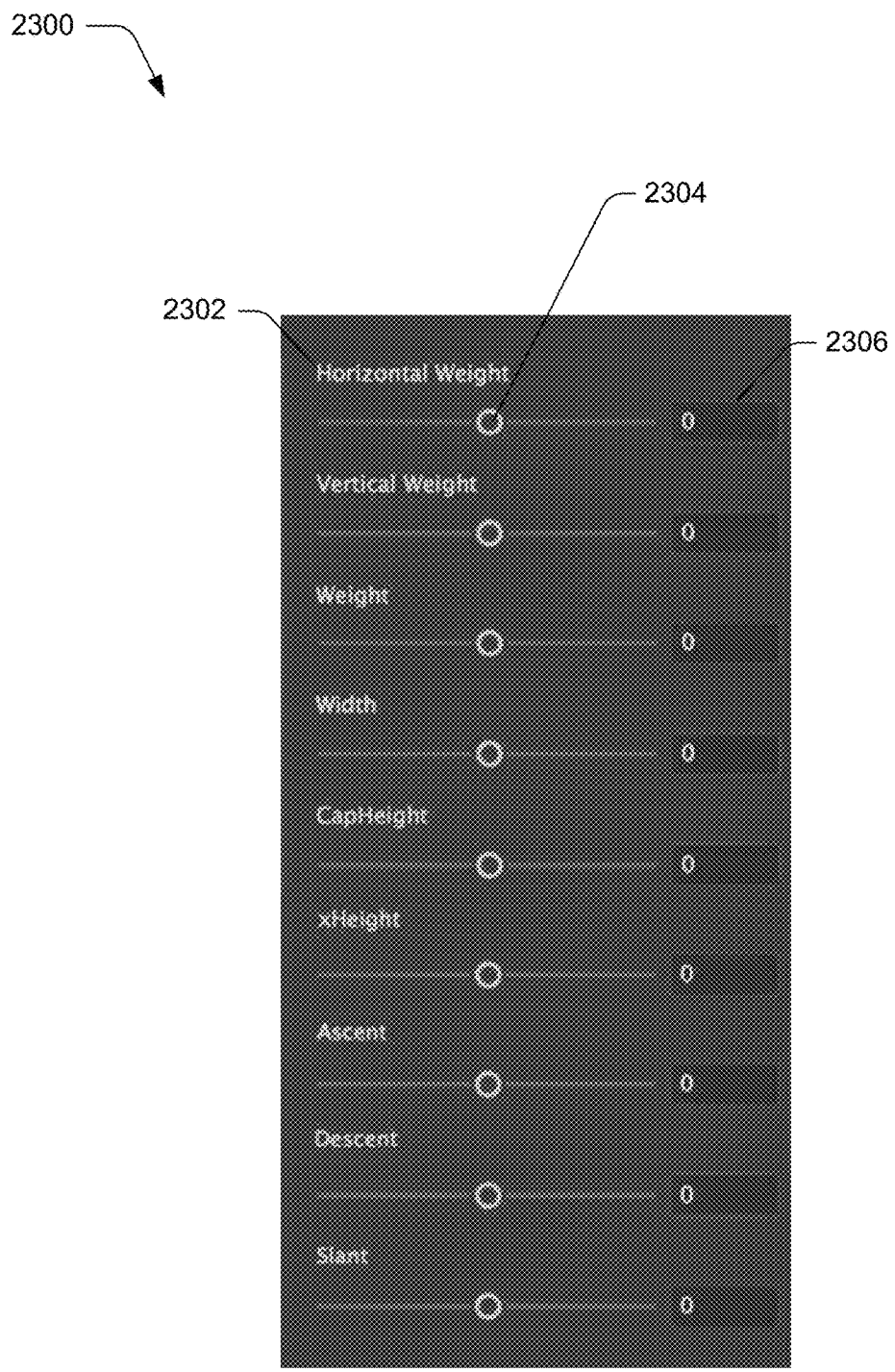
FIG. 23 is an illustration depicting an example representation of a user interface for glyph weight modification.

FIG. 23 is an illustration depicting an example representation 2300 of a user interface for glyph weight modification. In some implementations, a user may interact with the representation 2300 to generate the input data 118. As shown in FIG. 23, the representation includes an indication of a properties of the glyph to modify 2302, an adjustable indicator 2304, and a quantification of an amount by which to modify the properties of the glyph 2306 defined by the adjustable indicator 2304. In some examples, the adjustable indicator 2304 can be a slide bar adjustable between negative 100 percent and positive 100 percent. In other examples, the adjustable indicator 2304 can be limited to being adjustable between negative 50 percent and positive 50 percent as too much adjustment can overlap adjacent glyphs in an unexpected manner such as a manner that may not be visually acceptable to a user.

Example System and Device

Figure 24:
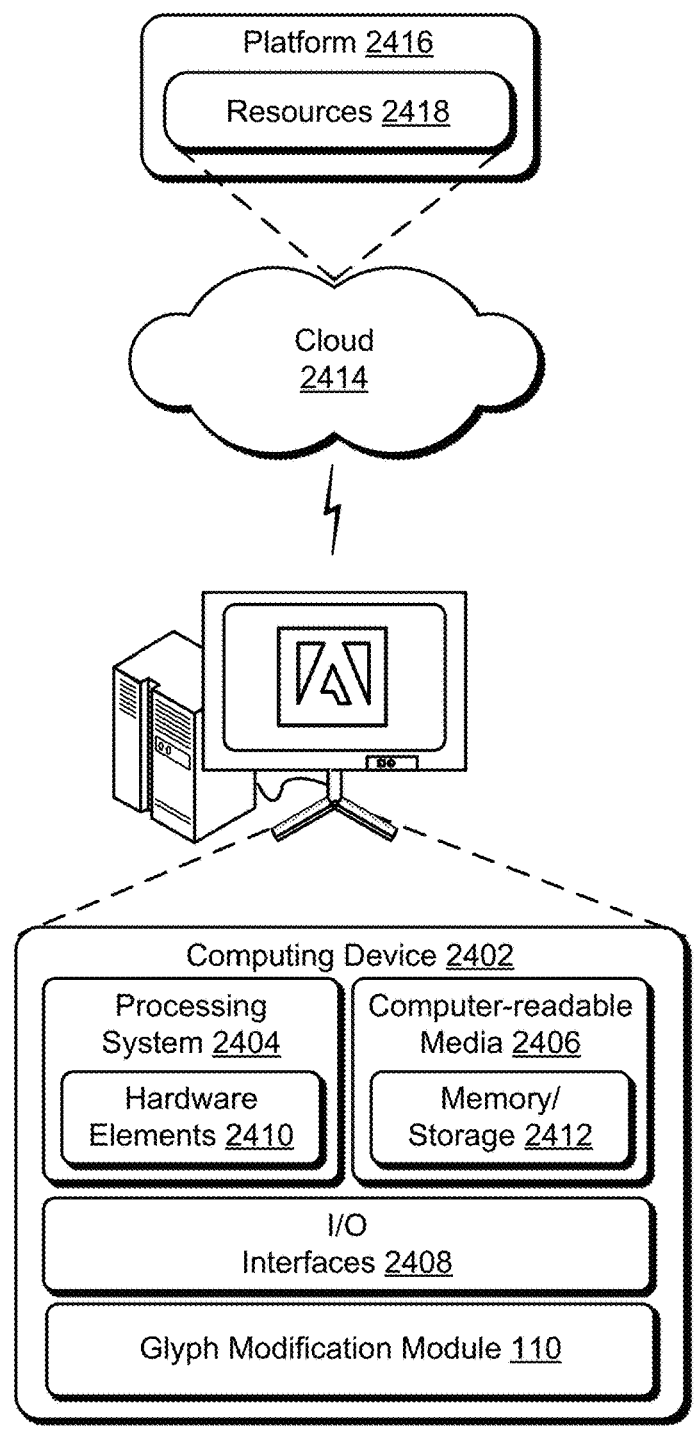
FIG. 24 illustrates an example system that includes an example computing device that is representative of one or more computing systems and/or devices that may implement the various techniques described herein.

FIG. 24 illustrates an example system 2400 that includes an example computing device that is representative of one or more computing systems and/or devices that may implement the various techniques described herein. This is illustrated through inclusion of the glyph modification module 110. The computing device 2402 may be, for example, a server of a service provider, a device associated with a client (e.g., a client device), an on-chip system, and/or any other suitable computing device or computing system.

The example computing device 2402 as illustrated includes a processing system 2404, one or more computer-readable media 2406, and one or more I/O interfaces 2408 that are communicatively coupled, one to another. Although not shown, the computing device 2402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2404 is representative of functionality to perform one or more operations using hardware. Accordingly, the processing system 2404 is illustrated as including hardware elements 2410 that may be configured as processors, functional blocks, and so forth. This may include implementation in hardware as an application specific integrated circuit or other logic device formed using one or more semiconductors. The hardware elements 2410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2406 is illustrated as including memory/storage 2412. The memory/storage 2412 represents memory/storage capacity associated with one or more computer-readable media. The memory/storage component 2412 may include volatile media (such as random access memory (RAM)) and/or nonvolatile media (such as read only memory (ROM), Flash memory, optical disks, magnetic disks, and so forth). The memory/storage component 2412 may include fixed media (e.g., RAM, ROM, a fixed hard drive, and so on) as well as removable media (e.g., Flash memory, a removable hard drive, an optical disc, and so forth). The computer-readable media 2406 may be configured in a variety of other ways as further described below.

Input/output interface(s) 2408 are representative of functionality to allow a user to enter commands and information to computing device 2402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2410 and computer-readable media 2406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2410. The computing device 2402 may be configured to implement particular instructions and/or functions corresponding to the software and/or hardware modules. Accordingly, implementation of a module that is executable by the computing device 2402 as software may be achieved at least partially in hardware, e.g., through use of computer-readable storage media and/or hardware elements 2410 of the processing system 2404. The instructions and/or functions may be executable/operable by one or more articles of manufacture (for example, one or more computing devices 2402 and/or processing systems 2404) to implement techniques, modules, and examples described herein.

The techniques described herein may be supported by various configurations of the computing device 2402 and are not limited to the specific examples of the techniques described herein. This functionality may also be implemented all or in part through use of a distributed system, such as over a "cloud" 2414 as described below.

The cloud 2414 includes and/or is representative of a platform 2416 for resources 2418. The platform 2416 abstracts underlying functionality of hardware (e.g., servers) and software resources of the cloud 2414. The resources 2418 may include applications and/or data that can be utilized while computer processing is executed on servers that are remote from the computing device 2402. Resources 2418 can also include services provided over the Internet and/or through a subscriber network, such as a cellular or Wi-Fi network.

The platform 2416 may abstract resources 2418 and functions to connect the computing device 2402 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 2400. For example, the functionality may be implemented in part on the computing device 2402 as well as via the platform 2416 that abstracts the functionality of the cloud 2414.

CONCLUSION

Although the implementation of glyph weight modification has been described in language specific to structural features and/or methods, it is to be understood that the appended claims are not necessarily limited to the specific features or methods described. Rather, the specific features and methods are disclosed as example implementations of glyph weight modification, and other equivalent features and methods are intended to be within the scope of the appended claims. Further, various different examples are described and it is to be appreciated that each described example can be implemented independently or in connection with one or more other described examples.

What is claimed is:

1. In a digital medium environment to modify a glyph, a method implemented by a computing device, the method comprising:
   receiving, by the computing device, input data describing a modification value for an outline of the glyph;
   representing, by the computing device, the outline of the glyph as a plurality of segments that each have a direction defined by points, each of the points is an endpoint of a first segment and a start point of a second segment of the plurality of segments;
   determining, by the computing device, coordinates for each of the points based on a direction of the first segment, a direction of the second segment, and the modification value;
   modifying, by the computing device, the outline of the glyph based on the determined coordinates for each of the points;
   preventing, by the computing device, an overlap of consecutive segments of the plurality of segments in the modified outline of the glyph by identifying at least one point of intersection of the consecutive segments; and
   generating, by the computing device, a modified glyph based on the modified outline of the glyph.

2. The method as described in claim 1, wherein the modification value increases or decreases a horizontal weight of the glyph.

3. The method as described in claim 1, wherein the modification value increases or decreases a vertical weight of the glyph.

4. The method as described in claim 1, wherein the modification value changes both a horizontal weight of the glyph and a vertical weight of the glyph.

5. The method as described in claim 1, further comprising shifting the modified glyph.

6. The method as described in claim 1, wherein the glyph and the modified glyph have a same origin.

7. The method as described in claim 1, further comprising determining a delta value to add to both sides of a vertical stem of the glyph based on the modification value.

8. The method as described in claim 1, further comprising determining a delta value to add to a top and a bottom of a horizontal bar of the glyph based on the modification value.

9. The method as described in claim 1, wherein at least one segment of the plurality of segments is a curve segment.

10. The method as described in claim 1, wherein at least one segment of the plurality of segments is a line segment.

11. The method as described in claim 1, wherein the modification value increases or decreases a true width of the glyph.

12. The method as described in claim 1, wherein the modification value increases or decreases a capheight of the glyph while maintaining a thickness of horizontal bars of the glyph.

13. A system comprising:

a memory component; and a processing device coupled to the memory component, the processing device to perform operations comprising:

receiving input data describing a modification value for an outline of the glyph; and representing the outline of the glyph as a plurality of segments that each have a direction defined by points, each of the points is an endpoint of a first segment and a start point of a second segment of the plurality of segments;

determining coordinates for each of the points based on a direction of the first segment, a direction of the second segment, and the modification value;

modifying the outline of the glyph based on the determined coordinates for each of the points;

preventing an overlap of consecutive segments of the plurality of segments in the modified outline of the glyph by identifying at least one point of intersection of the consecutive segments; and generating a modified glyph based on the modified outline of the glyph.

14. The system as described in claim 13, wherein the modification value increases or decreases a vertical weight of the glyph.

15. The system as described in claim 13, wherein the modification value increases or decreases a horizontal weight of the glyph.

16. One or more non-transitory computer-readable storage media comprising instructions stored thereon that, responsive to execution by a computing device, causes the computing device to perform operations including:

receiving input data describing a modification value for an outline of a glyph;

representing the outline of the glyph as a plurality of segments that each have a direction defined by points, each of the points is an endpoint of a first segment and a start point of a second segment of the plurality of segments;

determining coordinates for each of the points based on a direction of the first segment, a direction of the second segment, and the modification value;

modifying the outline of the glyph based on the determined coordinates for each of the points;

preventing an overlap of consecutive segments of the plurality of segments in the modified outline of the glyph by identifying at least one point of intersection of the consecutive segments; and generating a modified glyph based on the modified outline of the glyph.

17. The one or more non-transitory computer-readable storage media as described in claim 16, wherein the operations further include determining a delta value to add to both sides of a vertical stem of the glyph based on the modification value.

18. The one or more non-transitory computer-readable storage media as described in claim 16, wherein the operations further include determining a delta value to add to a top and a bottom of a horizontal bar of the glyph based on the modification value.

19. The one or more non-transitory computer-readable storage media as described in claim 16, wherein the operations further include shifting the modified glyph.

20. The one or more non-transitory computer-readable storage media as described in claim 19, wherein the glyph and the modified glyph have a same origin.

* * * * *